USO11113614B2

(12) United States Patent
Gerken et al.

(10) Patent No.: US 11,113,614 B2
(45) Date of Patent: Sep. 7, 2021

(54) ENTERPRISE HYPOTHESIS ORCHESTRATION

(71) Applicant: Intelligent Software Solutions, Inc., Colorado Springs, CO (US)

(72) Inventors: Mark Gerken, Colorado Springs, CO (US); Rick Pavlik, Colorado Springs, CO (US)

(73) Assignee: PARSONS CORPORATION, Centreville, VA (US)

( * ) Notice: Subject to any disclaimer, the term of this patent is extended or adjusted under 35 U.S.C. 154(b) by 1176 days.

(21) Appl. No.: 15/221,007

(22) Filed: Jul. 27, 2016

(65) Prior Publication Data
US 2017/0032262 A1 Feb. 2, 2017

Related U.S. Application Data

(60) Provisional application No. 62/198,189, filed on Jul. 29, 2015.

(51) Int. Cl.
*G06N 5/04* (2006.01)
*G06F 16/903* (2019.01)
*G06N 7/00* (2006.01)

(52) U.S. Cl.
CPC ....... *G06N 5/041* (2013.01); *G06F 16/90335* (2019.01); *G06N 5/048* (2013.01); *G06N 7/005* (2013.01); *G06F 2216/03* (2013.01)

(58) Field of Classification Search
None
See application file for complete search history.

(56) References Cited

U.S. PATENT DOCUMENTS

2013/0017523 A1* 1/2013 Barborak .................. G06N 5/04
434/322
2013/0325787 A1* 12/2013 Gerken .................. G06N 7/005
706/52

(Continued)

OTHER PUBLICATIONS

Ferrucci, David, Eric Brown, Jennifer Chu-Carroll, James Fan, David Gondek, Aditya A. Kalyanpur, Adam Lally et al. "Building Watson: An overview of the DeepQA project." AI magazine 31, No. 3 (2010): 59-79. (Year: 2010).*

(Continued)

*Primary Examiner* — Alexey Shmatov
*Assistant Examiner* — Casey R. Garner
(74) *Attorney, Agent, or Firm* — Marstensen IP; Michael C. Martensen

(57) ABSTRACT

Enterprise Hypothesis Orchestration provides users an intuitive system for building an inquiry model that thereafter creates and evaluates each of a plurality of hypotheses as it continuously searches for evidence to formulate, score, and resolve each hypothesis. The Enterprise Hypothesis Orchestration system moreover continuously deals with the uncertainty caused by noisy, missing, inaccurate, and/or contradictory data. The present invention uses abductive reasoning to infer the best explanation or hypothesis for a set of observations. Given an inquiry the Hypothesis Orchestration System identifies relevant data from which to form a plurality of hypotheses. It thereafter collects evidence in support of each hypothesis and crafts a degree of confidence that the hypothesis is true. If a hypothesis is found to lack support an analysis of any missing evidence is conducted to identify and seek which evidence would offer the highest benefit to resolving one or more of the plurality of hypotheses.

18 Claims, 11 Drawing Sheets

(56) References Cited

U.S. PATENT DOCUMENTS

| | | | | |
|---|---|---|---|---|
| 2014/0072947 | A1* | 3/2014 | Boguraev | G09B 7/00 434/362 |
| 2014/0229163 | A1* | 8/2014 | Gliozzo | G06F 40/30 704/9 |
| 2014/0280307 | A1* | 9/2014 | Gupta | G06N 5/025 707/769 |
| 2016/0378851 | A1* | 12/2016 | Merdivan | G06F 16/3344 707/722 |
| 2017/0103069 | A1* | 4/2017 | Brennan | G06F 16/2455 |

OTHER PUBLICATIONS

Talbot, Patrick J. "Automated discovery of unknown unknowns." In MILCOM 2006-2006 IEEE Military Communications conference, pp. 1-7. IEEE, 2006. (Year: 2006).*

Pike, William, Richard May, and Alan Turner. "Supporting knowledge transfer through decomposable reasoning artifacts." In 2007 40th Annual Hawaii International Conference on System Sciences (HICSS'07), pp. 204c-204c. IEEE, 2007. (Year: 2007).*

Burk, Robin, Mark Davis, Michele Morara, Steve Rust, Alan Chappell, Michelle Gregory, Liam McGrath, and Cliff Joslyn. "Semantic network analysis for evidence evaluation: The threat anticipation initiative." In 2011 IEEE Network Science Workshop, pp. 162-166. IEEE, 2011. (Year: 2011).*

Hanser, Thierry, Chris Barber, Edward Rosser, Jonathan D. Vessey, Samuel J. Webb, and Stéphane Werner. "Self organising hypothesis networks: a new approach for representing and structuring SAR knowledge." Journal of cheminformatics 6, No. 1 (2014): 21. (Year: 2014).*

Callahan, Alison, Michel Dumontier, and Nigam H. Shah. "HyQue: evaluating hypotheses using Semantic Web technologies." In Journal of biomedical semantics, vol. 2, No. 2, p. S3. BioMed Central, 2011. (Year: 2011).*

Roy, Jean. "Towards multiple hypothesis situation analysis." In 2007 10th International Conference on Information Fusion, pp. 1-8. IEEE, 2007. (Year: 2007).*

Stephanou, Harry E., and Andrew P. Sage. "Perspectives on imperfect information processing." IEEE transactions on systems, man, and cybernetics 17, No. 5 (1987): 780-798. (Year: 1987).*

Jones, Eric K., Nikolaos Denis, and Daniel Hunter. "Hypothesis management for information fusion." IEEE aerospace and electronic systems magazine 18, No. 6 (2003): 3-8. (Year: 2003).*

McCord, Michael C., J. William Murdock, and Branimir K. Boguraev. "Deep parsing in Watson." IBM Journal of research and development 56, No. 3.4 (2012): 3-1. (Year: 2012).*

* cited by examiner

ENTERPRISE HYPOTHESIS ORCHESTRATION

RELATED APPLICATION

The present application relates to and claims the benefit of priority to U.S. Provisional Patent Application No. 62/198,189 filed—Jul. 29, 2015 which is hereby incorporated by reference in its entirety for all purposes as if fully set forth herein.

STATEMENT REGARDING FEDERAL SPONSORED RESEARCH OR DEVELOPMENT

The U.S. Government has a paid-up license in this invention and the right in limited circumstances to require the patent owner to license others on reasonable terms as provided for by the terms of contract FA8750-11-C-0174 awarded by the United States Air Force.

BACKGROUND OF THE INVENTION

Field of the Invention

Embodiments of the present invention relate, in general, to predictive and forensic analysis and reasoning and more particularly to dynamic hypothesis generation, automated abductive reasoning and automated information needs analysis.

Relevant Background

The world of sensor and data ubiquity provides the opportunity to quickly obtain new knowledge and situation awareness. However, it also comes with the challenge of mining relevant information from the increasingly large "big data" repositories and data streams found in many of today's organizations. A long felt need exits for automated reasoning technology to address and effectively use these increasingly large repositories of data and assist $21^{st}$ century organizations with generating timely and accurate answers to hard questions such as "Which suspect most likely committed a crime?", "Which ships are currently under threat of piracy?", "What was the mostly likely cause of an accident or system failure?", or "Is a conflict escalating between rival gangs or nations?" A need exists for a reasoner that is highly interactive and capable of emulating and augmenting human problem solving while providing a unifying approach to reasoning even when subjected to uncertainty. The ideal solution should reduce the cost and time organizations spend performing data acquisition and analysis by automatically mining observation data relevant to questions of interest, forming and revising hypotheses associated with questions of interest, and forming and issuing targeted knowledge acquisition queries based on a mathematically grounded value of information ("VOI") calculus.

To assist human experts in answering hard questions about the past and make accurate forecasts about the future, $21^{st}$ century reasoning systems should provide an intuitive user experience for capturing the human knowledge and tradecraft necessary to model a problem. An ideal system should automatically form multiple, often times competing hypotheses and then gather as much evidence as possible to confirm or deny each hypothesis. In the real world of noisy, missing, changing, and contradictory data, the system should handle uncertainty and truth maintenance. The system should also maintain and update each hypothesis over a period of hours, weeks, or even months as situations unfold and new evidence emerges. The system should scale to work in high volume "big data" environments and the system should provide proven mathematical methods for scoring and assessing each piece of evidence and each hypothesis. Current systems and methodologies fail to meet these objectives.

What is needed, therefore, is a system that proactively and continuously searches for relevant information, automatically forms and updates hypotheses, identifies and seeks valuable missing evidence as well as notifies users and other systems when critical evidence is missing, provides a highly interactive and intuitive user experience for capturing human insight and providing meaningful explanations of the reasoning results, and ultimately informs users when a threat, cause, or predictive insight has been detected. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

The present invention combines probabilistic complex event processing, activity recognition, and predictive analysis. While each of these tools are descriptive of the present invention, what sets the current concept apart from the prior art is how it augments and emulates human problem solving and reasoning by generating, updating, scoring, and reasoning over a collection of hypotheses to effectively support a wide variety of use cases including predictive analysis, forensic reasoning causal reasoning, association discovery, and hypothetical "what-if" analysis. One or more embodiments of the present invention augments a form of human problem solving called "abduction" with state-of-the-art analytics to form an enterprise level, general purpose Hypothesis Orchestration System.

One embodiment of this Hypothesis Orchestration System is a method involving receiving an inquiry or set of inquiries ("inquiry" for convenience), and performing an initial search of a data repository (or repositories—again, "repository", for convenience) to identify evidence relevant to that inquiry. With this initial-search evidence, a plurality of hypotheses is formed based on observation data and information derived from observation data identified as relevant to the inquiry—each hypothesis is a proposed solution to the inquiry. Based on these newly-generated hypotheses, observation data and information derived from observation data relevant to one or more of these hypotheses are formed into a set of collected pieces of evidence. Each hypothesis is then evaluated based on the set of collected pieces of evidence to determine a confidence value for the respective hypothesis. For each hypothesis failing to exceed a predefined, threshold confidence value, one or more missing pieces of evidence is identified, and common missing pieces of evidence are isolated from missing pieces of evidence relevant to only a single hypothesis. A weighted value—a so-called Value-Of-Information (VOI) metric—is then formed for each missing piece of evidence and this VOI along with a missing piece evidence's applicably across multiple hypotheses commonality is used to decide if a search should be conducted to find this missing piece of evidence to reduce the uncertainty associated with those hypotheses which had earlier failed to meet threshold confidence values. Finally, the remaining hypotheses are further refined using the method described above in this paragraph.

Several additional embodiments of this Hypothesis Orchestration System ("HOS") method exist. In one embodiment, the inquiry seeks a predicted outcome based on past events, and the HOS search includes looking for pieces of evidence to confirm or deny a hypothesis. In another, the HOS method includes forming a semantic graph pattern describing a set of inquiries for the one or more pieces of evidence. Both embodiments include defining an evidence inquiry as either a branching inquiry or a non-branching inquiry. This branching inquiry can also automatically generate a new hypothesis or hypotheses branch for each piece of evidence that satisfies the evidence inquiry. In contrast, the non-branching inquiry can allow a plurality of pieces of evidence satisfying the evidence inquiry to support a single hypothesis. The method can also enable the branching and non-branching inquires to be combined and allows both branching and non-branching evidence inquiries to be used in support of a single inquiry. The method can further provide that each hypothesis includes inquiries for pieces of evidence, and each of the hypotheses is based on one or more pieces of the evidence collected. The method can further be expressed such that evidence is formed from observation data and/or information derived from observation data matching an evidence inquiry and as such evidence is observation data and/or information derived from observation data that the system deems applicable to a given inquiry, each piece of evidence is scored based on fuzzy membership functions. The scoring used by this method can include partial evidence matching as well as a consideration of a measure of confidence of each piece of collected evidence as well as a measure of uncertainty of each piece of collected evidence. The isolation of evidence referred to by the method can include scoring each missing piece of evidence with respect to its relevance and correlation to the hypothesis being examined. Further, the VOI metric can be based on collected evidence and a likelihood value of collecting missing pieces of evidence. The VOI metric can quantify the contribution of a missing piece of evidence to resolve or partially resolve the examined hypothesis. Responsive to the confidence value for the examined hypothesis' exceeding a predefined threshold value, a report can be generated which identifies the hypothesis or hypotheses for which the confidence value has exceeded the predefined threshold value. Finally, the common missing pieces of evidence to seek can be chosen based, at least in part, on the VOI metric.

Another embodiment of the Hypothesis Orchestration System is a computer implemented system having a microprocessor (aka processor) and a non-transitory storage medium housing a set of instructions, in which the processor-executed instructions receive an inquiry or set of inquiries ("inquiry" for convenience), and perform an initial search of a data repository (or repositories—again, "repository", for convenience) to identify evidence relevant to that inquiry. With this initial-search evidence, the executed instructions form one or more hypotheses based on evidence identified as relevant to the inquiry, where each hypothesis is a proposed solution to the inquiry. Based on these newly-generated hypotheses, the instructions collect evidence identified as relevant to one or more of these hypotheses from the data repository, and for each hypothesis form a set of collected pieces of evidence. The instructions then evaluate each hypothesis based on the set of collected pieces of evidence to determine a confidence value for the respective hypothesis. For each hypothesis failing to exceed a predefined, threshold confidence value, the instructions identify one or more missing pieces of additional evidence needed to help resolve the hypothesis, and isolate the common missing pieces of evidence from missing pieces of evidence relevant to only a single hypothesis. A weighted value—referred to herein as a "Value-Of-Information" (VOI) metric—is then formed by the instructions for each missing piece of evidence, and the instructions again search the data repository to find missing pieces of evidence based on the VOI and/or the applicability of the missing evidence across the hypothesis space, to reduce the uncertainty associated with those hypotheses which had earlier failed to meet the predefined threshold confidence values. Finally, the executed instructions refine any remaining hypotheses, as described above in this paragraph.

Yet another embodiment of the Hypothesis Orchestration System is a non-transitory computer-readable storage medium tangibly embodying a program of instructions executable by a machine, in which the program of instructions ("program") comprises program codes for hypothesis orchestration. In this embodiment, the program receives an inquiry, then searches one or more data repositories to identify pieces of evidence relevant to the inquiry. The program then forms one or more hypotheses based on evidence identified as relevant to the inquiry, and each hypothesis is a proposed solution of the inquiry. The program then collects evidence identified as relevant to one or more of the hypotheses from the one or more data repositories and for each hypothesis forms a set of collected pieces of evidence. The program then evaluates the hypotheses based on the collected evidence to determine a confidence value for each of the hypotheses. If the confidence value for any hypothesis fails to exceed a predefined threshold value, the program identifies one or more missing pieces of evidence that could help resolve uncertainty associated with that hypothesis. The system can then request the collection of observation data and/or the derivation or creation of data from an observation that could be used as evidence helping support or refute one or more hypotheses in the hypothesis space. The system can use the VOI score for missing evidence to guide requests for these data. The sub-threshold hypotheses are then refined using pieces of evidence collected via the VOI process described above along with any further evidence extracted from the observation data (including data streams. All of the sub-threshold hypotheses are re-defined in this fashion.

Several embodiments of the Hypothesis Orchestration System program of instructions ("program") and the Hypothesis Orchestration System computer-implemented system described above and are consistent with those features of the Hypotheses Orchestration methodology described above.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Enterprise Hypothesis Orchestration of the present invention provides users with an intuitive system for building an inquiry model that thereafter creates and evaluates each of a plurality of hypotheses using questions defined by the inquiry model as it continuously searches for the evidence needed to formulate, score, and resolve each hypothesis. The present invention moreover continuously addresses uncertainty caused by noisy, missing, inaccurate, and/or contradictory data.

Figure 1:
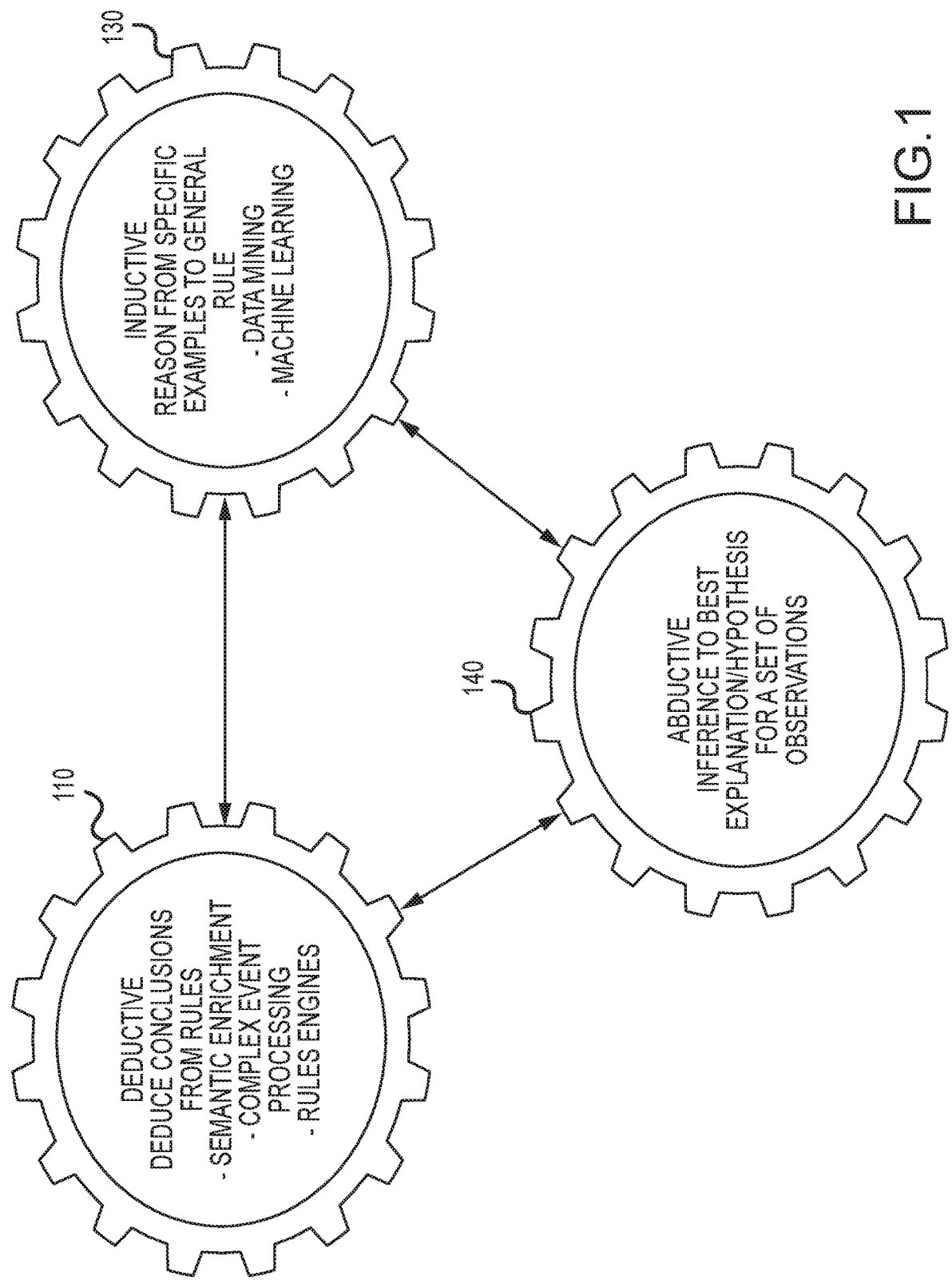
FIG. 1 shows high level block diagram depiction of a deductive, inductive and abductive reasoning and is association with enterprise level hypothesis orchestration of the present invention.

The present invention uses abductive reasoning to infer the best explanation or hypothesis for a set of observations. FIG. 1 presents a graphical rendition of the relationship between inductive 130, abductive 140 and deductive 110 reasoning. Inductive reasoning 130 is reasoning in which the premises (an assumption or assumptions that something is true) are viewed as supplying strong evidence for the truth of the conclusion. Data mining and machine learning are examples of inductive reasoning. Deductive reasoning 110 is the process of reasoning that links the premises (assumptions) to reach a logically certain conclusion. If all premises are true, the terms are clear, and the rules of deductive logic are followed, then the conclusion reached is necessarily true. Semantic enrichment, complex event processing and rules engines are examples of deductive reasoning. While the conclusion of a deductive argument is certain, the truth of the conclusion of an inductive argument is probable, based upon the evidence given. Abductive reasoning 140 is a form of logical inference that links an observation to a theory (hypothesis) which accounts for the collection of observations. In abductive reasoning evidence is drawn from observations: only those observations or information drawn from those observations that are relevant to a given inquiry become evidence supporting or refuting the question represented by the inquiry. Ideally abductive reasoning seeks to find the simplest and most likely explanation. In abductive reasoning 140, unlike in deductive reasoning 110, the assumptions do not guarantee the conclusion. One can understand abductive reasoning as being an "inference to the best explanation". The present invention models abductive reasoning. Note that abductive reasoning can be used to support reasoning from effects to possible causes (e.g., "Why did the turbine lose power?" or "Who committed this crime?") or from events or states of the world to possible outcomes (e.g., "Is country X preparing a missile launch?" or "Is country Y pursuing development of weapons of mass destruction?") or combinations thereof (e.g., "What caused the turbine to lose power and what other subsystems are likely to start failing as a result?"). Reasoning from effects to possible causes is called "forensic analysis" while reasoning from events or states of the world to possible outcomes is called anticipatory analysis, forecasting, or predictive analysis among others.

A hypothesis model, according to one embodiment of the present invention, defines a collection of related questions required to form and resolve the set of hypotheses that are used help answer difficult questions. Depending on what type of problem the user is trying to solve, a hypothesis model can represent an activity or situation, a forensic analysis, or a set of association discovery rules. The present invention models are, in one embodiment, based on the concepts and theory underlying Bayesian networks (belief nets). The invention extends these concepts in order to facilitate real-world, enterprise level automated abductive analysis. These extensions include mechanisms that facilitate highly generalized/reusable models, persistent evidence queries, real-time processing & truth maintenance, hypothesis branching, and enterprise-level distributed computing.

In the present invention, hypothesis models are composed of one or more evidence queries where an evidence query is a question or parameterized query for evidence that contributes to forming and/or resolving a hypothesis. An evidence query or search is seeking an event, supporting context, a state of the world, or relationships between events that helps to confirm or deny a hypothesis. In many cases, these questions are predictive in nature and can trigger additional knowledge acquisition in the form of sensor tasking, analytics, or human analysis. The present invention allows analysts to ask these questions in the form of a semantic graph pattern that describes a set of relationships between entities or as a collection of related relational data queries. In either case, the evidence queries are organized as a directed, acyclic graph ("DAG") in which each evidence query of the hypothesis model maps to exactly one node of the DAG. From a probabilistic reasoning perspective, each evidence query represents a random variable in an underlying Bayesian network.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

For the purpose of the present invention and to add clarity to the description the following terms are defined.

An inquiry is a question related to a problem statement. The inquiry frames the investigation or generation of each of a plurality of hypotheses. For example, a statement of fact may be, "An explosion occurred this afternoon." An inquiry related to that fact may be "Who is responsible for the explosion this afternoon?, or "Are any other groups planning bombing attacks?".

Evidence is, generally, information gained from a plurality of real-time data streams and data repositories. The universe of information is immense and encompasses all types of data. Such information can include electronic data, signal intelligence, published articles and studies, video recordings such as surveillance videos or cell phone images, electronic messaging data, etc. Evidence refers, in this context, as observable information or information derived from observation data that is relevant to one or more inquiries. Evidence exists in some tangible form and can be reviewed and analyzed.

A hypothesis is a possible solution or answer to an inquiry. Looking back to the former example, if the inquiry is "Who is responsible for the bomb that exploded this afternoon?" a possible hypothesis may include, "Jack, a domestic terrorist, is responsible for the explosion this afternoon." Similarly, another hypothesis responsive to the same inquiry may be, "Su accidently set off an explosion in the chemistry lab this afternoon." The present invention examines and evaluates these and other hypothesis responsive to the inquiry and can orchestrate the management of hypotheses associated with multiple inquiries. A hypothesis model makes use of one or more evidence queries to gather supporting or refuting evidence that can help answer the associated inquiry.

A hypothesis model defines a collection of related questions required to form and resolve the set of hypotheses that are used help answer difficult questions. A hypothesis model is a particular concept relevant to the inquiry. For example, and in continuance of the thread above, "The explosion this afternoon was a deliberate act of terror" or "The explosion this afternoon was an accident". A hypothesis model includes sub-hypotheses that can address or be used to answer the primary inquiry. For example, if it is known that the explosion was deliberate, the present invention would form alternative (sub) hypotheses around terrorist or criminal suspects. If the explosion was known or suspected to have been an accident, then the alternative hypotheses would be formed around employees or others having access to the facility at which the explosion occurred. This is an example of a forensic model. Alternatively, a predictive or forecasting model can be used.

In such a model, a scenario can exist such as large coal mine with ore trucks in which a question has been raised, "Are any of the ore trucks likely to breakdown while in operation?". A set of sub-hypotheses can be created such as, transmission slippage, engine over-speed, high brake temp, high oil temp, low oil pressure, presence of contaminants in exhaust, and being over-weight (over-loaded). In this model predictions of what could or is likely to occur is modeled versus what has already occurred.

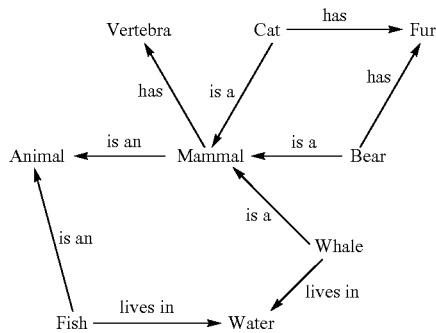

A semantic network or knowledge graph is a network that represents semantic relations between concepts. Such a graph often used as a form of knowledge representation and is useful to craft hypotheses responsive to an inquiry. It is a directed or undirected graph consisting of vertices, which represent concepts, and edges, which represent semantic relations between concepts. In the graph presented above, relationships between animals is depicted. The concepts include mammal, animal, bear, fish, water, whale, cat, vertebra, and fur. Clearly other concepts can be included such as dog, land, etc. Each edge shows the semantic relationship. For example, a mammal is an animal. Note that the relationship does not say that an animal is a mammal, which would be incorrect. Similarly, the graph shows that a whale is a mammal and lives in water as well as that a bear is an animal and has fur. Note that this simple semantic network makes no statements concerning whether whales or fish have fur or whether cats or bears live in water. The network simply states that which we know is true and makes no further assumptions. Based on this network we do not know whether fish have fur or not.

Semantic queries allow for queries and analytics of associative and contextual nature. Semantic queries enable the retrieval of both explicitly and implicitly derived information based on syntactic, semantic and structural information contained in data. They are designed to deliver precise results (possibly the distinctive selection of one single piece of information) or to answer fuzzy and wide open questions through pattern matching and digital reasoning. A Bayesian network is a belief network. Bayes(ian) model or probabilistic Directed Acyclic Graphical ("DAG") model is a probabilistic graphical model (a type of statistical model) that represents a set of random variables and their conditional dependencies via a directed acyclic graph. For example, a Bayesian network could represent the probabilistic relationships between diseases and symptoms. Given symptoms, the network can be used to compute the probabilities of the presence of various diseases. Formally, Bayesian networks are DAGs whose nodes represent random variables in the Bayesian sense: they may be observable quantities, latent variables, unknown parameters or hypotheses. Edges represent conditional dependencies and relations. Note that the for the purpose of this invention the term "latent" is understood to mean an event while existing has yet to manifest itself, it is hidden or concealed.

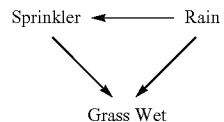

Each node is associated with a probability function that takes, as input, a particular set of values for the node's parent variables, and gives (as output) the probability (or probability distribution, if applicable) of the variable represented by the node. The illustration above represents a simple Bayesian network. Rain influences whether the sprinkler is activated, and both rain and the sprinkler sprinkler influence whether the grass is wet. If it rains there may be an 80% probability that the grass is wet and a 50% probability that the sprinkler will be turned off. Moreover, there may be a 95% probability that if the sprinklers are activated the grass is wet. Turning back to the prior example, it would not be reasonable to say that there is a 90% chance that the bear is a mammal but the determination of how the grass got wet is not so clear. Note that the edges in a Bayesian Network define conditional independence relationships between events. One benefit of using Bayesian Networks over basic probability calculus is that computer algorithms can exploit these conditional independence relationships to achieve highly scalable Bayesian inferencing.

A Value of Information ("VOI") metric is a measure of the importance of a particular piece of missing evidence in the context of a hypothesis or a set of hypotheses. As described hereafter the VOI examines various aspects of a missing piece of evidence and its impact on one or more hypothesis to craft a metric or measure of the value that would be achieved by gaining such missing information. Or, more formally, given a well-formed hypothesis model M consisting of N distinct nodes one of which is distinguished as the event of interest ($n_i$), evidence E, and Bayesian Network B isomorphic in structure to M in which each n in N maps to a binary random variable η in B, the information gain g of evidence e that could help resolve the evidence query of node n for a hypothesis h of M is in one instantiation of the invention could be defined as $|G_h(B,E,e)=P(n_i|B,E \cup e)-P(n_i|B,E)$. Continuing this discussion, one instance of the VOI across the hypothesis space H of M is $VOI_{e,H}=Z_{h \in H}|G_h(B,E,e)$ while one possible formulation of the VOI for evidence e across a collection Φ of inquiries each with a priority $p_i$ is $VOI_e = \Sigma_{I \in \Phi}(p_i \times VOI_{e,H \in I})$. One skilled in the art will realize alternate formulations of VOI are possible. The present invention permits the use of alternate VOI formulations.

A hypothesis confidence value measures the probability that a particular hypothesis is true in light of its existing collected set of evidence. The confidence value is generated each time new or updated evidence is associated with a hypothesis and reflects the system's certainty that, based on the evidence, the hypothesis is indeed true. Bayesian networks, among other things, can be used to calculate a hypothesis' confidence value.

An evidence query is a computer readable encoding of data sought in support of an inquiry (a query). A single evidence query may identify several constraints on data that may be used as evidence in support of an inquiry. A sample evidence query is shown in FIG. 6.C; this evidence query places several constraints on the data that must be satisfied for a collection of observation data to be used as evidence. The characterization of observation data that can be used as evidence in support of one or more hypotheses supporting one or more inquiries is an evidence query.

Forensic reasoning is a process by which an effect is linked back to its potential causes. In most cases the reasoning begins with an event and work backwards to find the most likely explanation.

Evidence is an observation of data (or information derived from observation data) that satisfies an evidence query either in part or in whole.

Used in the context of the present invention, an inquiry model is tuple tuple <Q, M, S, A> where:

Q is the core question the inquiry model is designed to resolve.

M is a hypothesis model consisting of a collection of (parameterized) evidence queries organized into a directed, acyclic graph (DAG) wherein the queries seek to find evidence that can help resolve the inquiry.

S is a collection of scoring functions $<S_C, S_N, S_M>$ describing how hypotheses associated with M are to be scored. Specifically:

$S_C$: C×O→[0 . . . 1] where C is a constraint or clause (an evidentiary condition) defined by an evidence query in M and O is a collection of observation data. In one instance of the invention, Fuzzy Membership Functions for this scoring function. One skilled in the art will recognize alternate scoring functions could be used here.

$S_N$: O×N×$S_{C_N}$→[0 . . . 1] where O is a set of observation data, N is a node in M, and $S_{C_N}$ is the set of scores defined by $\{S_C(C,O)|C \in N\}$. That is $S_N$ determines a score associated with a given node in a hypothesis model. It does so by combining the scores $S_C$ for the set of observation data O and each constraint or clause belonging to N. In one embodiment of the present invention, Fuzzy Logic is used to combine the scores for each constraint to form a score for the node and the given evidence. In this embodiment, the structure of evidence query associated with N is used to determine how under the rules of Fuzzy Logic constraint scores are to be combined. The function $S_N$ provides a means for measuring how well a set of observation data matches or satisfies an evidence query. One skilled in the art should realize different embodiments are possible. Note that observation data for which $S_N > 0$ becomes evidence in support of refutation of the associated inquiry.

$S_M$: M×N×$S_{M_N}$→[0 . . . 1] is a scoring function defined at the hypothesis model level. Specifically, this function combines the individual scores from each node N in M to determine scores for every node N in M regardless of whether N has matching evidence. In one embodiment of the invention, Bayesian Reasoning augmented with a virtual evidence technique is used to define this function. In this case, scores from individual evidence query nodes are folded into the Bayesian network using virtual evidence nodes. For example, suppose a node N in M has a Fuzzy Score $S_N$=0.95 for evidence e. In this case, the scoring system would add a new virtual node $V_N$ as a child (direct descendent) of N with the probability table defined as follows:

| N | e | not_e |
|---|---|---|
| n | 0.95 | 0.05 |
| not n | 0.05 | 0.95 |

To propagate the fuzzy score $S_N$ through the Bayesian network, the scoring system would then mark the evidence e as observed. Due to the laws of Bayesian Reasoning, doing so has the effect of propagating the partial satisfaction of the evidentiary conditions associated with N through the rest of the network.

In other embodiments, a simple point scheme is used where $S_M$ is defined as the product of $S_N$ given the observation data O and the predefined point value assigned to node N. For example, if $S_N$ given observation data O was 0.75 and N had a predefined point value of 10, then the value returned by $S_M$ for N given O would be 7.5. One skilled in the art would realize other scoring functions are possible.

Included in the description are flowcharts depicting examples of the methodology which may be used to hypothesis orchestration. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Hypothesis orchestration of the present invention uses an intuitive, graphical user interface to accept an inquiry, build hypothesis model(s) each of which as evidence is found and collected define a plurality of hypotheses related to that inquiry that are thereafter evaluated using questions to continuously search for the evidence needed to formulate, score, and resolve each hypothesis. All of this is done while continuously dealing with the uncertainty caused by noisy, missing, inaccurate, and contradictory data.

At a basic level hypothesis orchestration defines a hypothesis model and continually evaluates and revises the hypotheses based on evidence. The first step is to define or identify an inquiry (e.g., "Who killed Mr. Boddy?" or "Are any rouge nations attempting hostile missile launches?"). Next, construct a Hypothesis Model encoding parameterized evidence queries designed to seek evidence from observation data supporting or refuting the inquiry. Include any model-level parameters. Then select or define the scoring function (e.g., Bayesian/Fuzzy, Confidence increments, etc.) The reader should note that in the description that follows, various aspects of the invention are described by way of example. In one instance an inquiry is established as "Who killed Mr. Boddy?" while in another the inquiry is "Where are the Delivery Trucks?" In both instances, the examples are to be interpreted as illustrative and not limiting, and while many of the features of the present invention are discussed in view of these examples, others are omitted.

The hypothesis model is then placed into service by providing values for any model-level parameters (e.g., the "Rouge Nation" model may be parameterized on nation and timeframe) and defining the set of actions A associated with the model, including establishing any scoring thresholds. For example, only issue an alert using evidence E on node N if the score $S_N$ exceeds some threshold t.

Figure 6A:
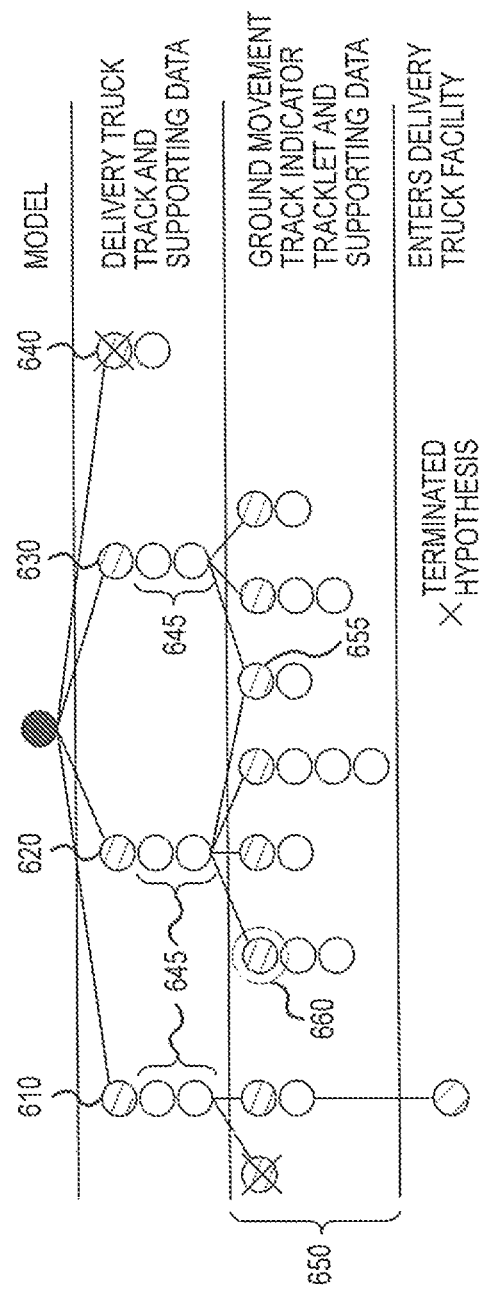
FIGS. 6A, 6B, and 6C depicts a graphical representation of an inquiry to identify the location of a truck according to one embodiment of the present invention.
Figure 6B:
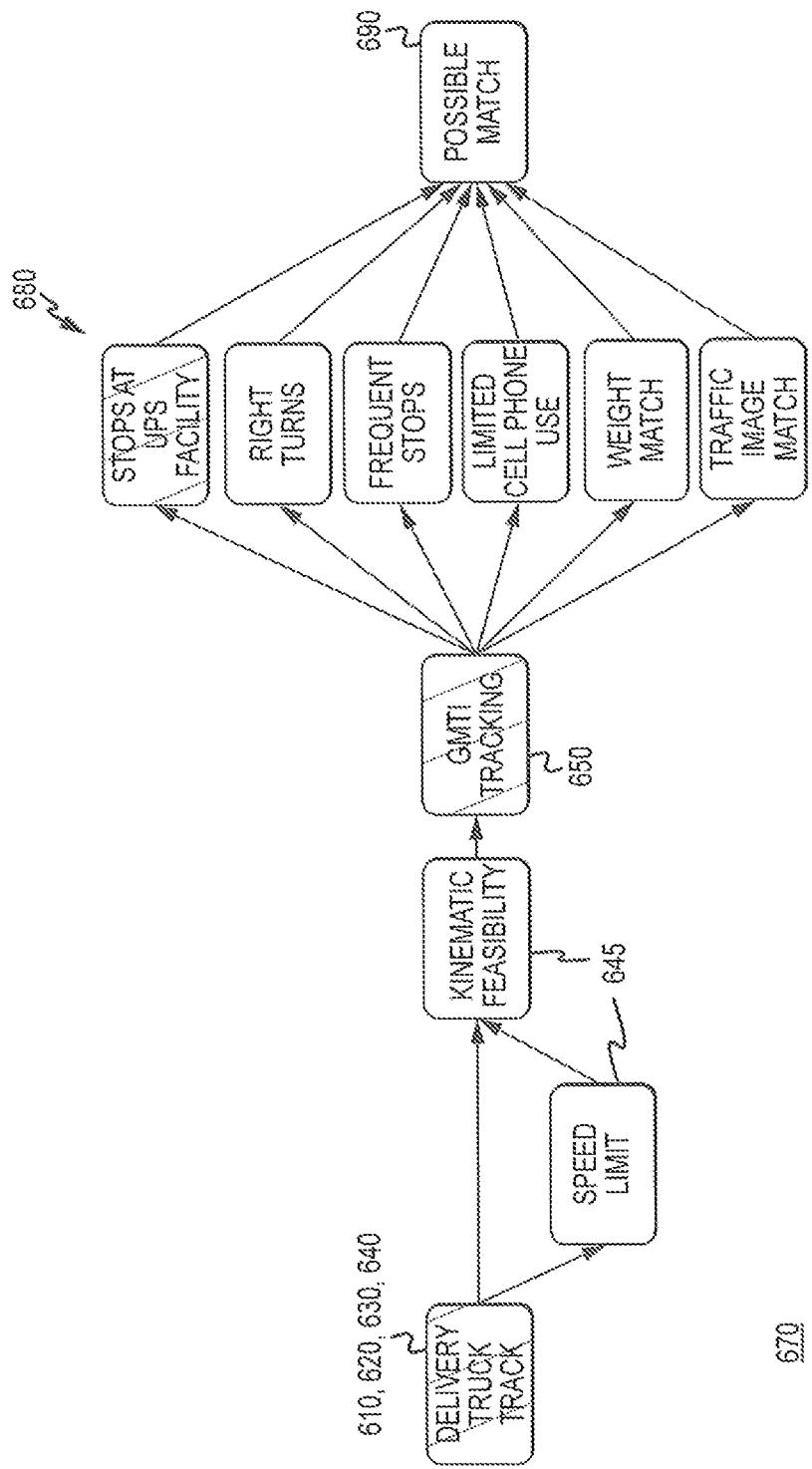

A search for evidence is then conducted. Using the model M, the present invention searches existing data, also called observation data O (including streaming data) for evidence that can be matched against (resolved) evidence queries q in M. An evidence query (also referred to herein as a query) is resolved if it either has no parameters or if it has values for every parameter in the query. The system uses resolved evidence queries to search for observation data matching the query. If evidence is found, then the invention scores that evidence using the scoring functions defined in S. If the node is a "branching node", then a new hypothesis is created using that evidence. And if the node is not a branching node, then that evidence is added to the collection of evidence for that node in the hypothesis structure. A notional hypothesis structure is shown in FIG. 6A corresponding to the sample hypothesis model of FIG. 6B. The hypothesis model in this example seeks to identify delivery trucks from contextual knowledge concerning the roadways and speed limits and from ground target moving indicator (GMTI) "tracklets" for largely unknown vehicles moving along the roadways, weight sensor data, and electronic intelligence (ELINT) data associated with cell phone use. A taskable traffic camera is available that can be used to take an image of a vehicle as selected traffic locations, and a sensor at the distribution centers reports when delivery trucks leave the facility but due to sensor limitations, the track on those trucks is soon lost as the trucks move out of sensor range. These data together form the observation data for this problem. As shown in FIG. 6B, the hypothesis model creates a new hypothesis for each delivery truck that leaves a distribution center. As shown in FIG. 6B, four such tracks have been found, each of which becomes a first level branch in the hypothesis space for this model. As shown in FIG. 6A, roadway information and speed limit data is gathered for the areas surrounding the last known location of their respective delivery truck (for sake of simplicity, the evidence queries associated with this model are omitted). Although not shown, an action from the set of actions A associated with this model computes regions of kinematic feasibility describing the geography extent of possible travel of the truck in question. As shown in FIG. 6A, the next branch in the hypothesis space is created as GMTI tracklets that are kinematically feasible possible solutions to the "where is the delivery truck" question are found. As shown in this figure, additional branching take place if evidence is found that the truck in question has entered a distribution center. It should be noted that this example is for illustrative purposes only and should not be considered limiting in any sense. Also note that each pathway from the root of the hypothesis structure to a leaf in the tree denotes a hypothesis, and that hypotheses may share overlapping evidence.

The invention can be configured so that in parallel with the step for searching for evidence above, if any underlying observation data previously determined to be evidence in support of a model M changes, the invention will re-evaluate all hypotheses affected by that change in data. For example, if the medical examiner determines the cause of death of Mr. Boddy was by stabbing rather than blunt-force trauma, the invention would re-evaluate all hypotheses that included the blunt-force trauma data. When so configured, the invention is able to maintain consistency between changing observation data and the evidence used to generate hypotheses.

Lastly, after scoring, action functions defined by A are evaluated and executed. Note that this includes data transforms (e.g., computing possible travel distances given a road network and speed limits), issuing alerts and/or retractions (if needed), and generating requests for information if needed. In one embodiment of the invention, the set of A of actions is implemented using the Groovy scripting language. These actions have full access to the evidence matched against a hypothesis model and may use that evidence as needed.

Hypothesis models of the present invention, as describe above, are composed of multiple, related evidence queries. In these cases, it is possible to frame a particular question in terms of previously obtained evidence. In that instance the present invention uses a context propagation mechanism that allows an evidence query (seeking evidence) to reference existing evidence that is already associated with a particular hypothesis. The initial evidence associated with a hypothesis typically anchors the hypothesis in time, space, and/or some other dimension. Using context propagation, the present invention dynamically forms subsequent evidence queries to incorporate the context established by previously obtained evidence. This capability extends well beyond spatiotemporal context to include entity identifications, entity properties, relationships, etc. Ultimately, this capability of the present invention allows analysts to create generalized, highly reusable hypotheses models that can automatically monitor thousands or millions of simultaneous hypotheses.

Figure 4A:
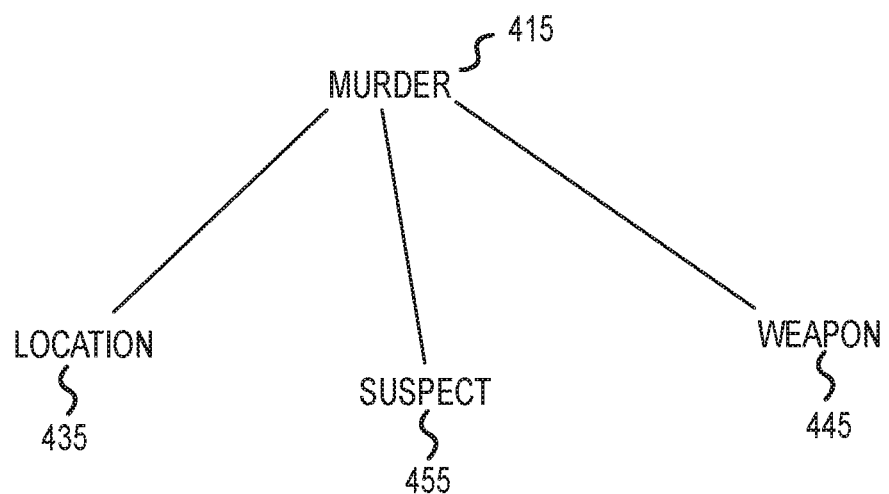
FIGS. 4A and 4B are renditions of a semantic graph illustrating the relationship between and event and a plurality of hypotheses, according to one embodiment of the present invention.

Recall that a hypothesis model describes 1) what data is needed to support or refute the inquiry, and 2) how the hypothesis space and associated evidence should be organized. Internally, the present invention uses a hyper-tree structure to organize evidence (observation data matched against a model), where each path through the hyper-tree defines a unique hypothesis. Note that we will often have hypotheses with overlapping evidence. For example, the hypothesis structure shown in FIG. 4A for "who killed Mr. Boddy" could have branches based on suspect 455, murder weapon 445, and location 435 (e.g., Prof. Plum with the hammer in the library, Prof. Plum with the hammer in the den, Prof Plum with the candlestick in the library, etc.).

A hypothesis model is therefore used to form hypotheses from observation data in order to answer a single inquiry. Most inquiries must consider multiple competing hypotheses. In one embodiment of the present invention an original inquiry may be decomposed into a set of simpler hypothesis models where each such hypothesis model represents a partial answer to the original inquiry. The results of each of these sub-hypothesis models get combined into a higher order abductive model that collectively answer the query. This modular approach facilitates reuse of the sub-models, is much easier to manage and test, and is easier to visualize and understand. One skilled in the art should realize the ability to create alternative hypothesis models designed to collect evidence supporting or evidence refuting the associated inquiry, while a scoring function S could be defined to combine the scores from these (competing) hypotheses.

The plurality of hypotheses depends on how the branching nodes were defined in the model and how much evidence is associated with each branching node. Model reuse assumes that models are being used to assess multiple, simultaneously occurring instances of a problem. E.g., If the Department of Transportation (DOT) is using the system of the present invention to monitor the state of each large intersection in Denver for accidents, pan handlers, electrical outages, flooding or other disruptive events, then the present invention would generate a separate hypothesis with respect to the inquiries outlined above (from the same reusable model(s)) for each intersection. Depending on how the problem is modeled the invention might generate multiple competing hypotheses for each intersection.

One aspect of the present invention is to identify and seek additional or missing evidence that can resolve or assist in the resolution of multiple hypotheses. Moreover, the abductive nature of the invention enables an inference to a possible solution rather than requiring a direct causal link.

To better illustrate the innovative aspects of the present invention, consider the following example. As discussed, the present invention assists in addressing or answering questions. These questions or inquiries can be, and often are, complex but to better illustrate the invention assuming the following set of facts. Mr. Boddy was found murdered in the library. A question (inquiry) has been raised, "Who killed Mr. Boddy?" If tracking individual suspects and murder weapons was desired (e.g., Col Mustard with the candlestick), then the hypothesis model should be constructed such that the suspect and murder weapons were branching nodes in the model. This is thus a forensic analysis as it investigates an event that has already occurred.

Figure 2:
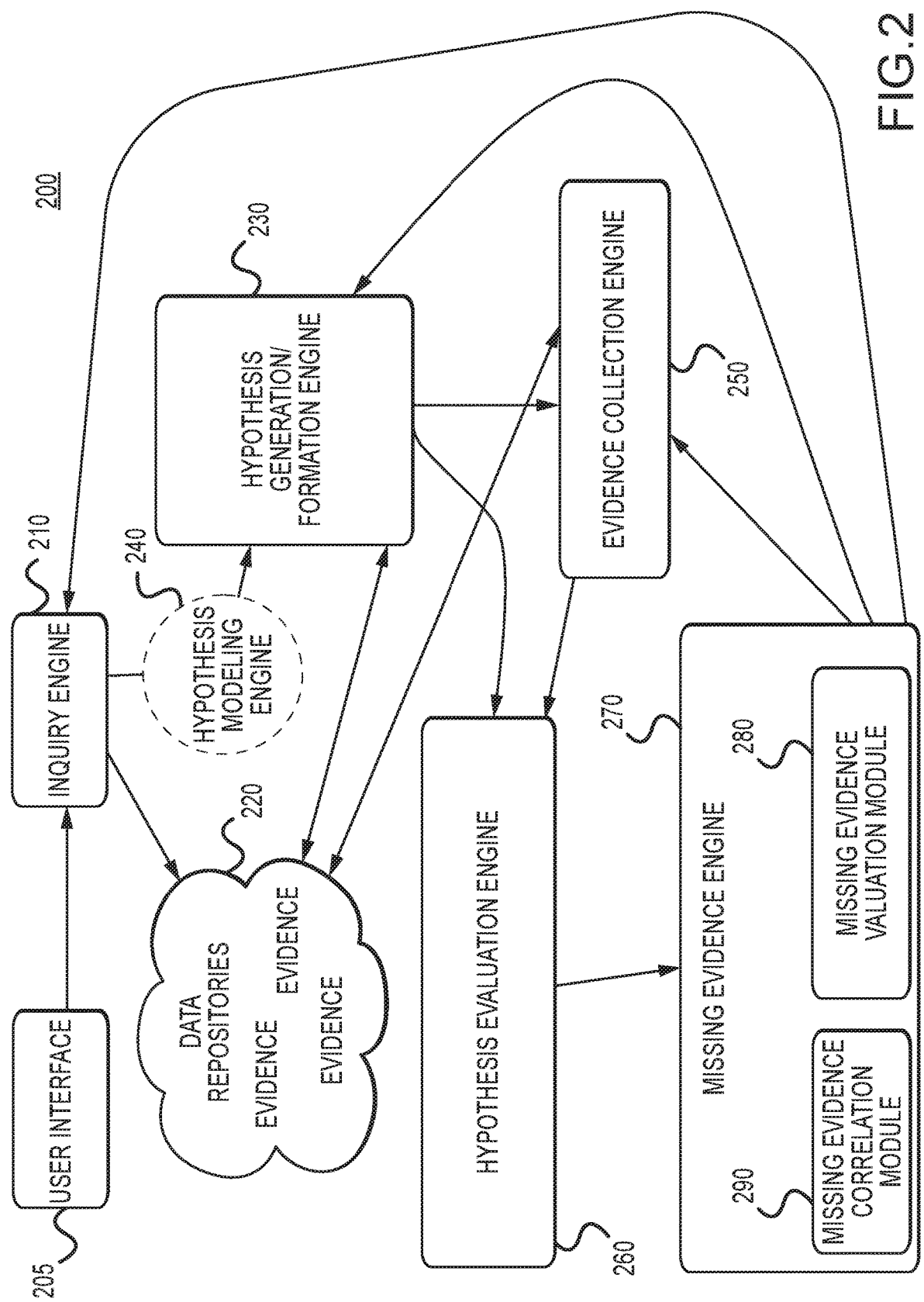
FIG. 2 shows a high-level block diagram of a system for hypothesis orchestration according to one embodiment of the present invention.

FIG. 2 presents a high-level block diagram for a hypotheses orchestration system according to one embodiment of the present invention. The system 200 receives from a user interface 205 an inquiry. The inquiry engine 210 accepts the inquiry and searches one or more data streams and/or repositories 220 of observations data for relevant evidence. As one of reasonable skill in the relevant art will appreciate, the amount of data available for analysis at any moment of time is immense. Yet most of the data is irrelevant to any particular inquiry. The inquiry engine 210 assesses the inquiry and issues a search for evidence relevant to the inquiry. Evidence is drawn from observations: only those observations or information drawn from those observations that are relevant to a given inquiry become evidence supporting or refuting the question represented by the inquiry. In this example, the inquiry engine 210 searches for evidence relevant to the murder of Mr. Boddy. Such evidence may include recent police reports, home address, newspaper articles, financial holdings, Tweets involving Mr. Boddy and potential suspects, known acquaintances, business dealings, partners and associates, family records and the like. At the same time data such as the temperature of the sea water off the Hawaiian coast, while available, is likely not relevant to the question of who murdered Mr. Boddy. Moreover, if Mr. Boddy was found to have died from blunt force trauma in the library, determining who possesses the candlestick could be important while the temperature of the dining room could be completely irrelevant.

In one instance of the invention, by searching one or more data repositories 220 the inquiry engine 210 forms a pool of relevant observation data that is formed into a semantic data graph. This graph not only identifies the individual observations but also describes how they may relate to other pieces of data. For example, assume that Mr. Boddy was a friend of or a business associate of Mrs. White, Professor Plum, Miss Scarlet and Colonel Mustard. Further assume the evidence search discovered that Colonel Mustard is a marksman and routinely hones his skills in archery and shooting and that he is known for having heated exchanges. He has also been seen courting Miss Scarlet. These facts would be represented in the data graph, such as "#ColMustard :hasSkill marksman:handgun".

The inquiry engine 210 would also identify that Mrs. White is Mr. Boddy's maid and has the characteristic of being an old biddy. She is very poor and takes her role as maid of the manor very seriously. Professor Plum, while intelligent, has the reputation of being scatterbrained and often can't remember where he has been 5 minutes ago. While intelligent and apparently kind hearted he has repeatedly been known to steal things. And Miss. Scarlet is a flirt and has been known to use her knowledge of her beauty to her advantage. Miss. Scarlet lives beyond her means normally at the expense of her wealthy bachelor to whom she is dating.

Figure 4B:
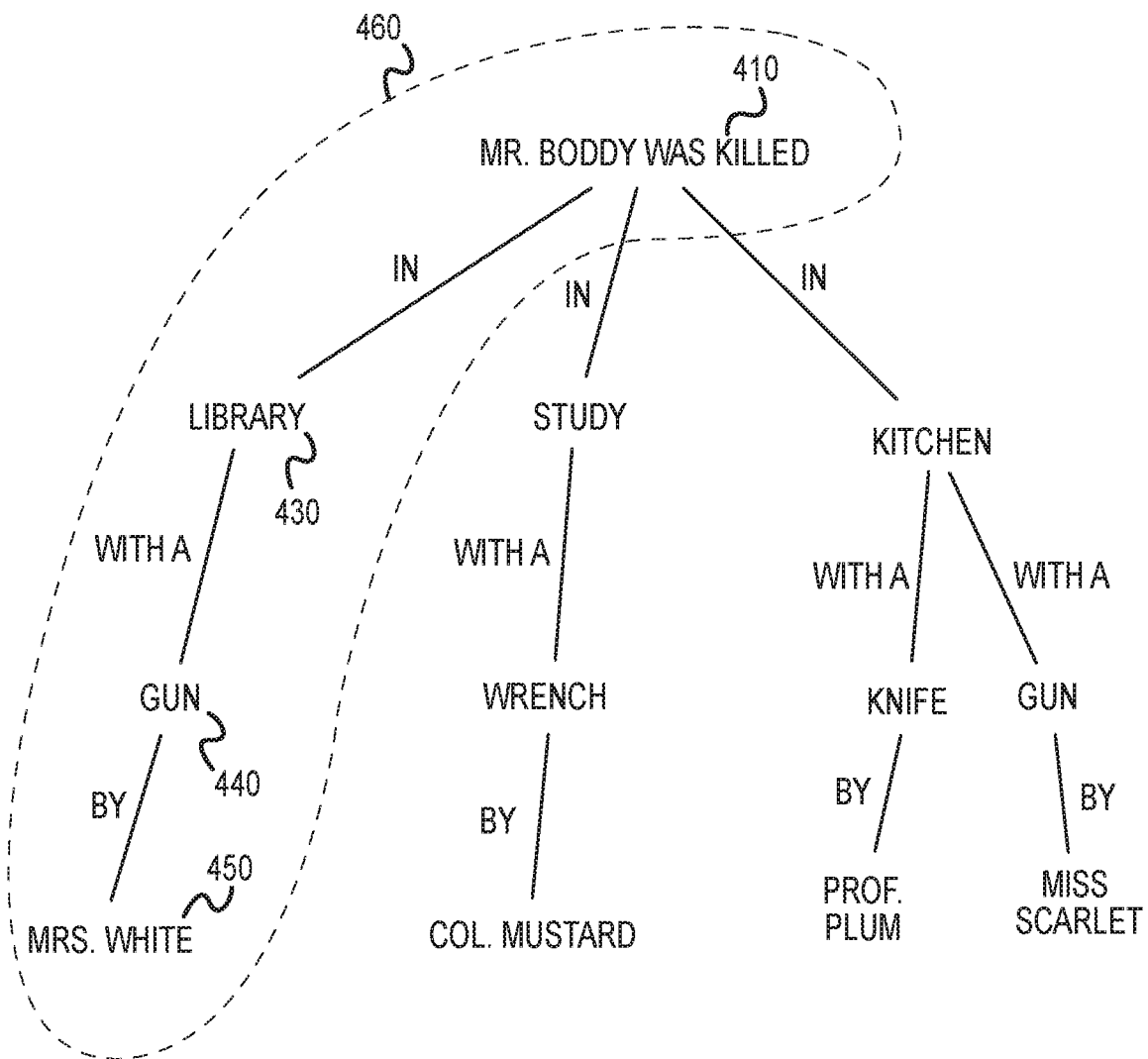

These and other pieces of data along with the fact that all of the individuals were present at Mr. Boddy's estate at the time his body was discovered can be graphically expressed in a semantic graph. Using this information, the present invention uses its hypothesis generation/formation engine 230 to craft a plurality of hypotheses in response to the inquiry; who killed Mr. Boddy by matching elements of the observation data against the hypothesis model for that inquiry For the purposes of this simple example, assume the system has crafted a basic hypothesis model shown in FIG. 4A. The investigation of the murder 415 can be approached by examining the location 435, the suspect 455 or the weapon 445. There is no indication that any of these branches is more favorable than the other and each may, and indeed will, lead to multiple hypotheses. The example discussed below focuses on location 435 yielding four possible hypotheses as to who killed Mr. Boddy, shown in FIG. 4B. They include, "Mrs. White killed Mr. Boddy in the library with a gun", "Professor Plum killed Mr. Boddy in the kitchen with a knife", "Miss. Scarlet killed Mr. Boddy in the kitchen with a gun", and "Colonel Mustard killed Mr. Boddy in the study with a wrench." The graphical rendition begins with a common node 410 that Mr. Boddy was killed. Thereafter the rendition branches into four different hypotheses that addresses the inquiry of who killed Mr. Boddy. For example, the left most branch 460 represents the hypothesis that Mr. Boddy was killed in the library 430 with a gun 440 by Mrs. White 450.

One with reasonable skill in the relevant art will appreciate that an actual inquiry and semantic evidence graph may generate thousands of plausible hypotheses. One feature of the present invention is to continually review and refine the plurality of hypotheses. Moreover, the present invention has the ability to consider whether the actual inquiry itself should be revised. For example, perhaps the more pertinent question is not "Who killed Mr. Boddy?" but "Why was Mr. Boddy killed?".

Two powerful modeling features of the present invention, implemented by the hypotheses modeling engine 240, determines how individual hypotheses are created and explored. Hypothesis branching allows the system to define each evidence query as branching or non-branching. For a branching query, a new hypothesis will automatically be generated for each unique evidence object that satisfies the query. This allows analysts to explore and score each unique thread of evidence as a separate hypothesis. Alternatively, a non-branching query will not generate a separate hypothesis for each unique evidence object, but instead allows multiple evidence objects to support a single hypothesis. Branching and non-branching evidence queries can be combined to provide an extremely powerful mechanism for exploring the hypothesis space associated with a particular problem. In addition, the present invention supports hypothesis variables that allow analysts to "target" a generalized hypothesis model to a specific problem or use case. In these cases, the analyst is prompted to answer a set of questions when they place the model into service that focuses the analysis and limits the set of hypotheses formed.

While each hypothesis represents possible a solution to the inquiry, for any particular hypothesis to be considered likely, it must be supported by a sufficient amount evidence. An evidence collection engine 250 therefore accrues evidence, for each evidence query node in the hypothesis model, from the pool of observation data. While each hypothesis will have a unique set of supporting evidence, some evidence may support multiple hypotheses.

Turing back to the example, assume evidence that would support the conclusion (hypothesis) that Miss Scarlet killed Mr. Boddy in the kitchen with a gun, may include, Mr. Boddy was found deceased in the kitchen, Mr. Boddy received various wounds including a gunshot wound, Miss. Scarlet owns a handgun, and Miss Scarlet's handgun has been recently fired. Similarly, another set of pieces of evidence suggests that Mrs. White killed Mr. Boddy in the library with a gun.

Figure 5:
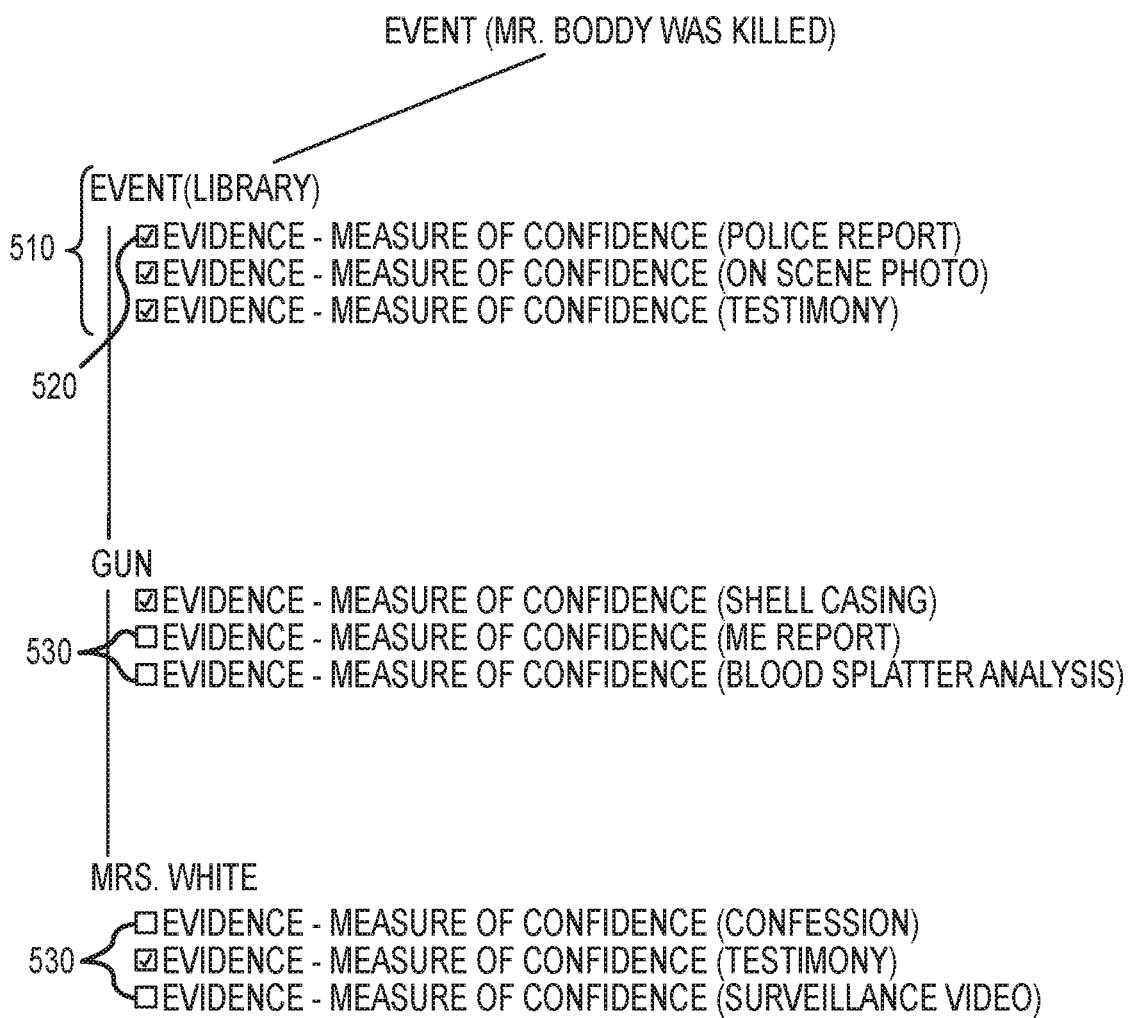
FIG. 5 is a high-level depiction of the relationship between various pieces of evidence and a plurality of hypotheses according to the present invention.

FIG. 5 is an expanded rendition of the hypothesis branch of FIG. 4 depicting the hypothesis 460 that Mr. Boddy was killed in the library 430 with a gun 440 by Mrs. White 450. In this example, the top-level node on the graph represents the event that Mr. Boddy was murdered. The other nodes in the graph represent supporting evidence: the location of the event (the Library), the type of weapon used (in this case a gun), and information concerning a suspect, Mrs. White. In general, determining whether or not an event has occurred or has been observed is determined though abductive reasoning by examining various pieces of evidence 510 associated with that event. The types of evidence that would support determining whether an event has occurred is described in an evidence query or, for complex events, via a collection of related evidence queries.

For example, and as illustrated in FIG. 5, the event that Mr. Boddy was killed in the library is supported by evidence 510 such as a police report indicating that upon arrival to the manor Mr. Boddy's body was found in the library. Similarly, a photo of Mr. Boddy's body in the library is evidence that he was killed in the library as is testimony from members of the staff that found the body. Other evidentiary conditions may fall within the evidence description that supports the conclusion that Mr. Boddy was killed in the library.

Each of these pieces of evidence have been collected (observed) as indicated by the check mark 520 in the box. In addition, each of the pieces of evidence has a certain degree or measure of confidence that it is an accurate statement. For example, the police report may have a 95% measure of confidence indicating that one can substantially rely on the material represented in the report as being accurate and true. The testimony on the other hand, while collected, may have a 70% measure of confidence.

The hypothesis developed above continues to presume that Mr. Boddy was killed with a gun by Mrs. White. In this instance three pieces of evidence 520 have been identified that would support that Mr. Boddy was killed by a gun. They include shell casings found near the body, a report from the Medical Examiner ("ME") that the cause of death was due a gunshot wound, and a blood spatter analysis of the walls surrounding the body. One skilled in the relevant art will appreciate that this illustration is simplistic and that the system considers a plurality of pieces of evidence that can support this conclusion.

FIG. 5 indicates that two of the three pieces of evidence that would indicate, shown by the boxes not checked 530, that a gun was used to kill Mr. Boddy are missing. Likewise, two of the three pieces of evidence that would support a conclusion that it was Mrs. White that used a gun to kill Mr. Boddy are also missing. The present invention, as described below assesses these missing pieces of evidence to determine which, if any, provides significant value in resolving this and other hypotheses. With further reference to FIG. 2, the missing evidence engine 270, in coordination with the missing evidence correlation module 290 and the missing evidence valuation module 280, identify, correlates and values missing evidence that, upon collection, can alter the resolution of one or more hypotheses.

A core feature of the present invention is its ability to access or evaluate each hypothesis based on its set of collected pieces of evidence. But, as illustrated above, some of the evidence is likely missing. For example, assume that all of the above items of evidence exist (have been observed) except for whether Mr. Boddy was found deceased in the kitchen. Evidence identifies that Mr. Boddy was found deceased in the manor but does not specifically identify the room. This begs the question as to what conclusion can be drawn from the evidence.

In one embodiment of the present invention the hypothesis evaluation engine 260 evaluates each hypothesis based on its set of collected pieces of evidence using a combination of Fuzzy logic at the evidentiary condition and evidence query levels and Bayesian inferencing at the hypothesis model level.

When operating against sematic graph data, the evaluation engine scores each hypothesis by examining each triple of the form [subject, predicate, object]. Turning back to FIG. 4B an example of a simple triple is [Mr. Boddy was killed, IN, the library]. This is a clause or triple in the hypothesis that Mr. Boddy was killed in the library with a guy by Mrs. White. The present invention scores each clause or triple in graph form using the scoring functions defined for that inquiry model.

The invention then asserts the "E=T" as observed and use Bayesian reasoning from there. Note that this uses a "virtual evidence" technique described by Pearl.

In addition to Bayesian inference, the present invention supports alternative scoring methods including basic confidence increments (e.g., a simple positive or negative confidence value is associated with each evidence query). These values are then combined to provide an overall confidence score for a hypothesis. While both techniques support missing and contradictory evidence, a key benefit of Bayesian inference is that it calculates posterior probabilities for all hypotheses and sub-hypotheses based on observed evidence. This facilitates the predictive analysis and proactive knowledge acquisition previously highlighted in FIG. 5.

As a result of the evaluation of each hypothesis, a measure of confidence is assigned to the hypothesis. The measure of confidence reflects the support of the hypothesis based on the collected set of evidence. Note that not all evidence is considered equally valued. Each piece of evidence carries with it a measure of certainty that reflects the degree to which the observation and reported event actually occurred or is true. Thus, while this example is a simple rendition of the present example, real world applications of the hypothesis orchestration system of the present invention are much more complex.

The present invention, based on user input and other settings, establishes a predefined threshold value for the measure of confidence. Assume that for a hypothesis to be reported to the user as a solution to the inquiry it must reach a 90% confidence value. Thus, sufficient evidence has been accrued to support a 90% degree of belief in the hypothesis as calculated using the underlying Bayesian belief net associated with the hypothesis. A report to the user indicates the confidence level and the caveats as to why the confidence value is not 100%. One should note that evidence can increase or decrease the belief in a hypothesis.

Those hypotheses in which the confidence value does not exceed the predefined threshold are each examined to identify which pieces of evidence in the formation of the hypotheses are missing. Recall that a hypothesis is a potential solution or resolution to the inquiry. This solution is supported by various events that are supported by evidence. Many of these events are supported by existing evidence but some of the events in the hypothesis may not have adequate evidentiary support.

Turing back to our example, consider the hypothesis that Professor Plum killed Mr. Boddy in the kitchen with a knife. Evidence that would support this hypothesis may include that Professor Plum was in the manor at the proposed time of the murder, that the wounds leading to Mr. Boddy's death included knife wounds, that a knife has been found with Mr. Boddy's blood on the blade, that Professor Plum was known to own a knife similar or identical to the discovered knife, and perhaps fingerprint on the knife matching Professor Plum. The evaluation of this hypothesis and its supporting evidence may find that the set of collected pieces of evidence support that Professor Plum was at the manor at the time of Mr. Boddy's death and that Professor Plum was known to own a knife. However, evidence as to nature of the wounds that led to Mr. Boddy's death or even the location of a knife with blood on the blade may be missing. Thus the hypothesis evaluation engine 260 gave this hypothesis a confidence value that was below the threshold level. Further, the system has identified at least two missing pieces of evidence.

The system of the present invention concurrently examines each hypothesis that fails to reach the confidence value threshold for missing pieces of evidence. Consider one of the alternative hypotheses; Mrs. White killed Mr. Boddy in the library with a gun. Evidence to support this hypothesis may include that Mrs. White was in the manor at the time of Mr. Boddy's death, that the wounds leading to Mr. Boddy's death included gunshot wounds, that Mrs. White was known to own gun, and ballistic analysis identifies bullets removed from Mr. Boddy came from Mrs. White's gun.

Yet, again, the set of collected pieces of evidence does not match each of the suppositions of the hypothesis resulting in a low confidence value. As before certain pieces of evidence are missing. Yet in this hypothesis the identified missing pieces of evidence are different. Assume that that while Mr. Boddy clearly had wounds it is unclear how they were caused and which one resulted in his death. Further, assume that no ballistic analysis of Mrs. White's gun is available.

The hypothesis orchestration system 200 of the present invention, and specifically the missing evidence correlation module 290, isolates one or more common missing pieces of evidence that is (are) relevant to two or more of the plurality of hypotheses that have failed to meet the predetermined threshold value of confidence. Secondly and separately each missing piece of evidence is assessed a value of information metric by the missing evidence valuation module 280. The Value of Information metric is an indication of just how important this single piece of evidence is to resolve one or more hypotheses.

The present invention's Bayesian-based predictive analysis facilitates value of information (VOI) metrics based on the information gained and likelihood values associated with missing evidence identified by the missing evidence engine 270. These values provide VOI metrics formed by the missing evidence valuation module for determining what missing information adds the most value towards resolving a given hypothesis. Information requests can be triggered to initiate human analysis and inputs, sensor tasking, or computationally expensive analytics.

These two pieces of information are used by the hypothesis orchestration system of the present invention, and specifically the missing evidence engine 270, to identify which pieces of missing evidence should be sought (or not sought) to improve confidence associated with one or more of the plurality of hypotheses. Turning back to the example above, both of the mentioned hypotheses lack certain pieces of evidence. A commonality of missing evidence exists with respect to the wounds that Mr. Boddy experienced and those that caused his death. Thus finding evidence that identifies the type of wounds Mr. Boddy suffered and a determination as to which caused his death would assist in the resolution of both hypotheses. Concurrently, a value of information metric is performed on each piece of missing evidence using the missing evidence valuation module 280. While the determination of wounds and the cause of death is helpful the VOI for a fingerprint or a ballistic test may be higher than an autopsy report. The present invention considers these differences and implications and makes an assessment as to which piece of missing evidence should be sought.

A focus of the present invention is the assessment of which piece(s) of missing evidence are the most valuable and which offer the highest impact on resolving one or more of the plurality of hypotheses. Investigatory and collection resources are often expensive and are limited. For example, gathering a certain piece of evidence could require a laboratory to extensive testing or task a satellite to take images of a certain geographical location. Each of these resources are associated with a certain cost and availability.

Moreover, one of reasonable skill in the relevant art will appreciate that the number of plausible hypotheses to a particular inquiry could be in the order of thousands or millions. Each may possess a plurality of pieces of evidence and a plurality of missing pieces of evidence. By identifying which missing pieces of evidence is more likely to resolve multiple hypotheses the computing efficiency of the system increases significantly.

Figure 3A:
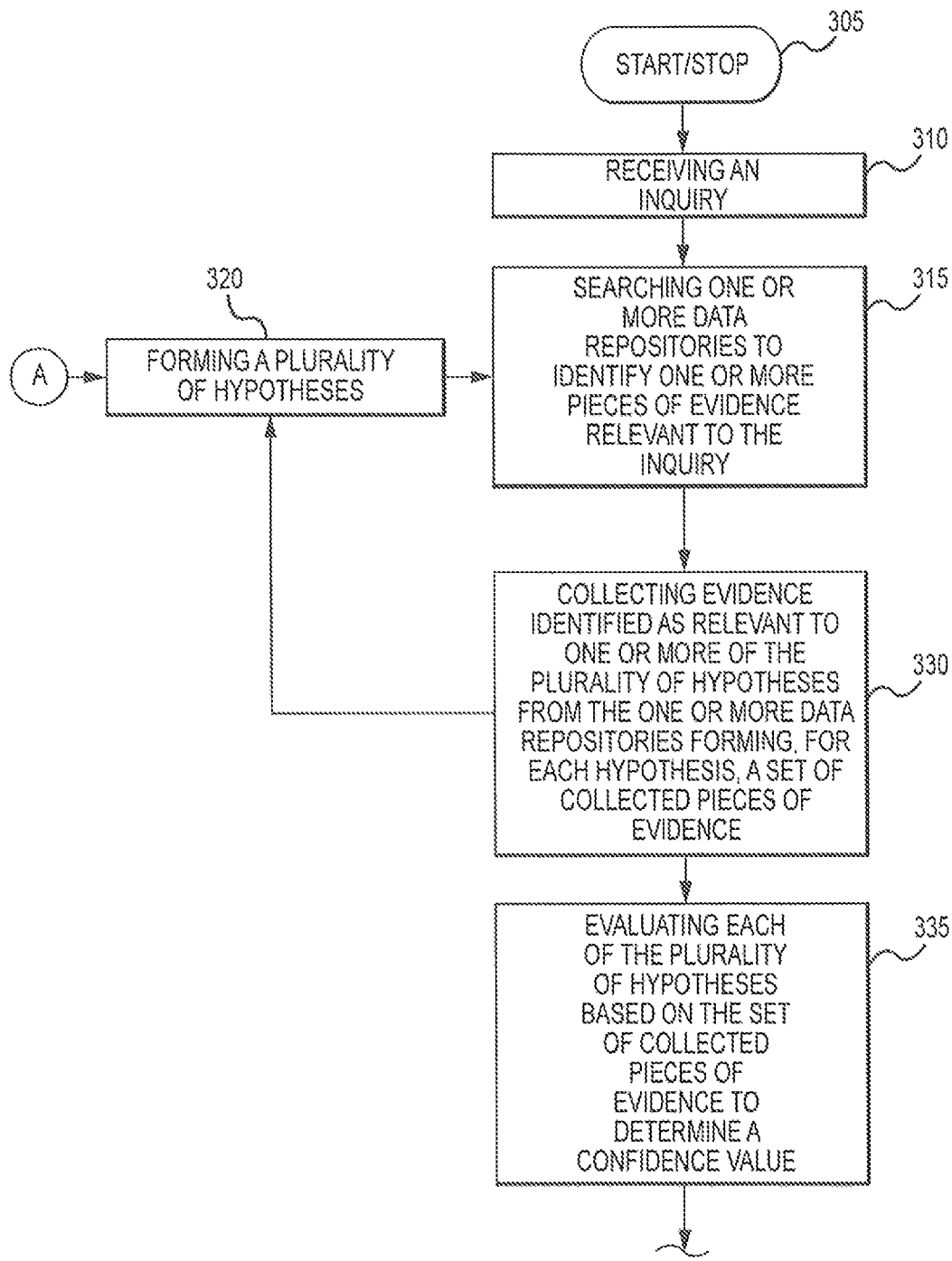
FIGS. 3A and 3B combine to form a flowchart of one embodiment of a method for hypotheses orchestration according to the present invention.
Figure 3B:
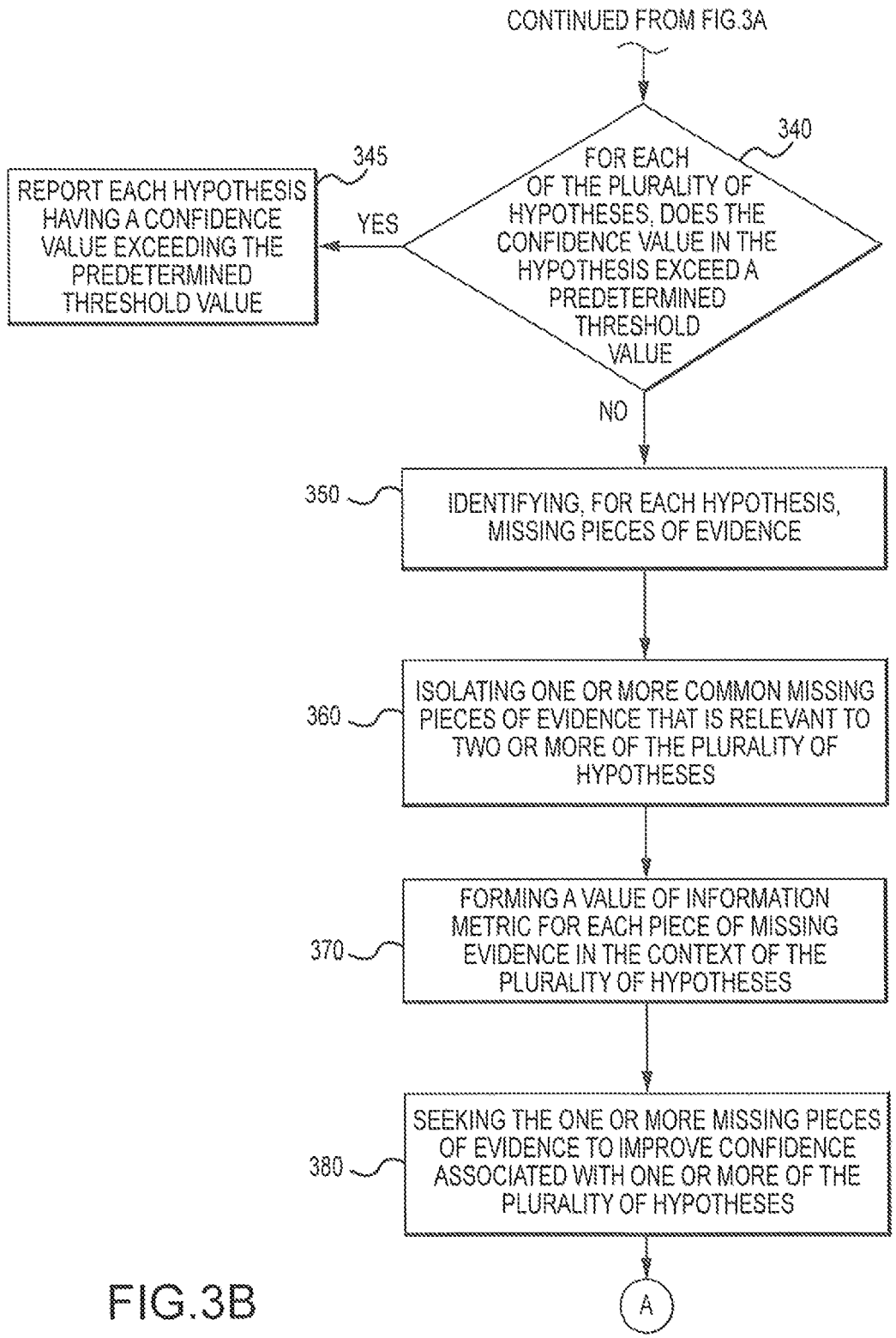

FIG. 3 presents a flowchart for hypotheses orchestration according to one embodiment of the present invention. Hypotheses orchestration begins 305 with receiving 310 (or generating) and inquiry. In most instances, an inquiry is initiated by a user through a user interface however, in other embodiments of the present invention, an initial inquiry may foster other related inquiries generated automatically to fully address and examiner the scope of an initial investigation. Thus, using our example, the initial of inquiry, "Who killed Mr. Boddy?" begins the process of hypotheses generation and orchestration.

The inquiry sets parameters with respect to what knowledge the investigation should consider. As one of reasonable skill in the relevant art will appreciate, existing data repositories and the ability to tap real-time streaming data yields voluminous amounts of information. Most of such information is not applicable to any one inquiry. Thus, a primary step in the methodology of the present invention is to search 315 the one or more data repositories and real-time streaming data feeds to identify one or more pieces of evidence relevant to the inquiry. This search yields a general set of relevant information that is structured into a semantic knowledge graph From this assemblage of relevant data, and in light of the inquiry, the hypothesis generation and formation engine 230 provides 320 a plurality of hypotheses addressing the inquiry. Recall that each hypothesis is a potential solution to the inquiry and each is founded in the assemblage of relevant evidence. In other embodiments, a hypotheses modeling engine forms sets and subsets of hypotheses relevant to the initial inquiry.

Thereafter, and for each hypothesis, the evidence collection engine 250, collects 330 evidence relevant to each particular hypothesis. By doing so, a set of collected pieces of evidence is produced that can be thereafter evaluated 335 by the hypothesis evaluation engine 260 to determine whether a particular hypothesis has resolved the initial inquiry.

From each set of collected pieces of evidence, a confidence value is determined. The confidence value is a measure of how likely the hypothesis is true based on collected pieces of evidence. If the confidence level reaches and/or exceeds a predefined threshold 340 a report is generated 345 indicating which hypotheses have reached this metric. If during the evaluation of the set of collected pieces of evidence the confidence value for a hypothesis has not exceed the threshold 340, the set of collected pieces of evidence for each hypothesis is examined to identify 350 which pieces of evidence are missing.

Recall, that when each hypothesis is formed based on the assemblage of relevant evidenced each hypothesis resolves the inquiry with a set of events that are each supported by one or more pieces of evidence. The system, however, does not require all of the pieces of evidence to be present. Given the inquiry and the semantic knowledge graph the system can determine that an event would be supported through one or more pieces of evidence. Some of those pieces of evidence may have already occurred and have been collected but others pieces of evidence may yet to have been collected. For example, the medical examiner's report as to the cause of Mr. Boddy's death. It is reasonable to expect the report will exist and that it may be very helpful as a piece of evidence, but it may not yet have been completed. Thus, the evidence, while pertinent, is missing.

The present invention identifies 350, for each hypothesis that fails to meet the predefined threshold of confidence, missing pieces of evidence. Once identified an examination is run to determine if there is a correlation between the missing pieces of evidence and their associated hypotheses. By doing so common missing pieces of evidence that are relevant to two or more hypotheses are isolated 360. For example, of 100 distinct hypotheses related to the same inquiry that failed to reach the confidence value threshold, the system 200 may determine that 50 of them lack the same piece of missing piece of evidence. This fact can be valuable in the determination of which evidence to seek given limited resources or capabilities.

The invention goes beyond simply isolating 360 common missing pieces of evidence. The invention also forms 370 a valuation of information metric for each piece of missing evidence. The invention recognizes that just because a particular piece of missing evidence is missing from several hypotheses that it is the most important piece of missing evidence. Indeed, given the other hypothesis and the nature of the missing piece of evidence, a single piece of evidence may have more informational value than one that is common among several hypotheses.

Using both the value of information metric and information relating the commonality of missing pieces of evidence the invention determines, in light of limited resources, which piece or pieces of missing evidence should be sought. The invention then initiates a request from one or more collection resources to seek 380 one or more pieces of missing evidence to improve the confidence value of one or more pending hypotheses relevant to the initial inquiry. The present invention can generate requests for critical evidence to confirm hypotheses as well as generate evidence requests for events that are predicted to occur in the future. The invention can direct automated sensor tipping and cueing or trigger human analysis and/or computational automated analysis. Information requests can be triggered to initiate human analysis and inputs, sensor tasking, and the like.

A core aspect of the present invention is its iterative nature. In the example above the initial inquiry was "Who killed Mr. Boddy?" That inquiry and a search of the data repositories crafted 4 plausible hypotheses. The present invention, as a result of the search for missing evidence to help in resolving these hypotheses will reform, refine, delete and add to the plurality of hypotheses. Moreover, the system, in a different embodiment, can reform the inquiry itself. Perhaps, using the example above, the question is not "Who killed Mr. Boddy?" but rather, "Why was Mr. Boddy killed."

Accordingly, the present invention can accept and investigate multiple inquiries, each having a plurality of hypotheses. As illustrated above each investigation of the plurality of hypotheses will identify missing pieces of evidence. These missing pieces of evidence will be examined for commonality among the plurality of hypotheses consistent with the description above but the present invention also has the ability to identify common missing pieces of evidence across multiple inquiries as well as across the plurality of hypotheses for a single inquiry. By doing so seemingly low attributable value of information of a single missing piece (or pieces) of evidence for one inquiry can be reevaluated when it seems to have commonality across multiple inquires.

Recall that an inquiry defines a question of interest, such as "Who killed Mr. Boddy?" (a forensic question), or "Are any of our ore-hauling trucks likely to fail today?" (a predictive question), or "Are there any indications of missile launch preparations by rouge nations?" (potentially a combination forensic and predictive model). For a given inquiry, a hypothesis model defines the data (evidence) needed to help resolve the question(s) associated with the inquiry and describes how the plurality of hypothesis (also referred to as the hypothesis space) should be organized.

Consider another illustrative scenario using the hypothesis orchestration system of the present invention. Assume there is a desire to keep track of delivery trucks. Suppose in this scenario the sensor system can establish a track on a delivery truck as the trucks leave their distribution center but can only maintain track lock for a relatively short duration due to sensor coverage.

The data reported by this sensor includes departure time, direction, truck number, and time and location of the vehicle when the track was lost.

Other available sensors in this problem space include the following:

Ground moving target indicator (GMTI) data, essentially "dots on a map" representing moving vehicles, many of which are unknown (e.g., JSTARS produces this type of data)

In-lane weight sensors which report the weight of vehicles that cross the sensors Locations of active cell phones Traffic cameras available for tasking, only one of which may be operated at a time Background Knowledge and Evidence Includes:

Speed limits and roadway information

Location of delivery truck facilities

Knowledge also can be gained that delivery truck vehicles tend not to make left-hand turns, frequently make short stops at locations outside of normal traffic intersections, and the drivers make limited use of cell phones. Given this inquiry ("Can the locations of delivery trucks be inferred in urban environments?") and above collection of sensors and supporting data, one possible hypothesis model is shown in FIGS. 6 A, B and C. In FIG. 6B, branching nodes are shown as circles with a slanted line fill while non-branching nodes are shown with clear circle.

The hypothesis model shown in FIG. 6B 670 is designed to monitor each delivery truck separately (the first node is a branching node). Thus, each branch 610, 620, 630, 640 represents the location of a different truck. Using contextual knowledge of the roadways and speed limits, the next two (blue) nodes 645 determine a search region based on kinematic feasibility: given speed limits and road network, how far could the delivery truck have traveled? The next node 650 searches for GMTI tracks for unknown vehicles that are within the kinematic feasibility region for that truck. The next series of nodes 680 assess cell phone usage, the frequency of stops, the preponderance of right-handed turns, and whether the GMTI track indicates stops at known delivery truck facilities. The last node, "Possible Match" 690 is a latent node in this model: there are no explicit evidentiary conditions associated with that node. Instead, the confidence or score for "Possible Match" is based on the scores for its predecessors in the model.

Given this model, a notional hypothesis space is shown in FIG. 6A. In this case, there were four delivery trucks 610, 620, 630, 640 being monitored, one of which was later reclassified by the sensor system as being some other vehicle (rightmost branch) 640. For each of the remaining hypotheses, speed limit data and kinematic feasibility information (evidence) 645 have been found. As shown in the next level of branching 650, the first truck initially had two GMTI tracks associated to it, one of which was later retracted (e.g., the vehicle for the track was identified as something else), while the second truck has four and the third truck three GMTI tracks, one of which 655 is a part of the hypothesis space for both Truck 2 and Truck 3. Although not shown, a separate hypothesis model shares the GMTI track data shown circled 660. Observation data may be associated as evidence across, zero, one or more hypotheses or associated with one or more hypotheses models, each of which is associated with an inquiry. Moreover, distinct inquiries may potentially have overlapping hypothesis models (e.g., the circled GMTI track may be part of a hypothesis space for completely different inquiry). Note too that there are alternate hypothesis models that could be created for this inquiry. For example, one such model may start with GMTI tracks and attempt to determine which if any of them belong to delivery trucks.

Figure 6C:
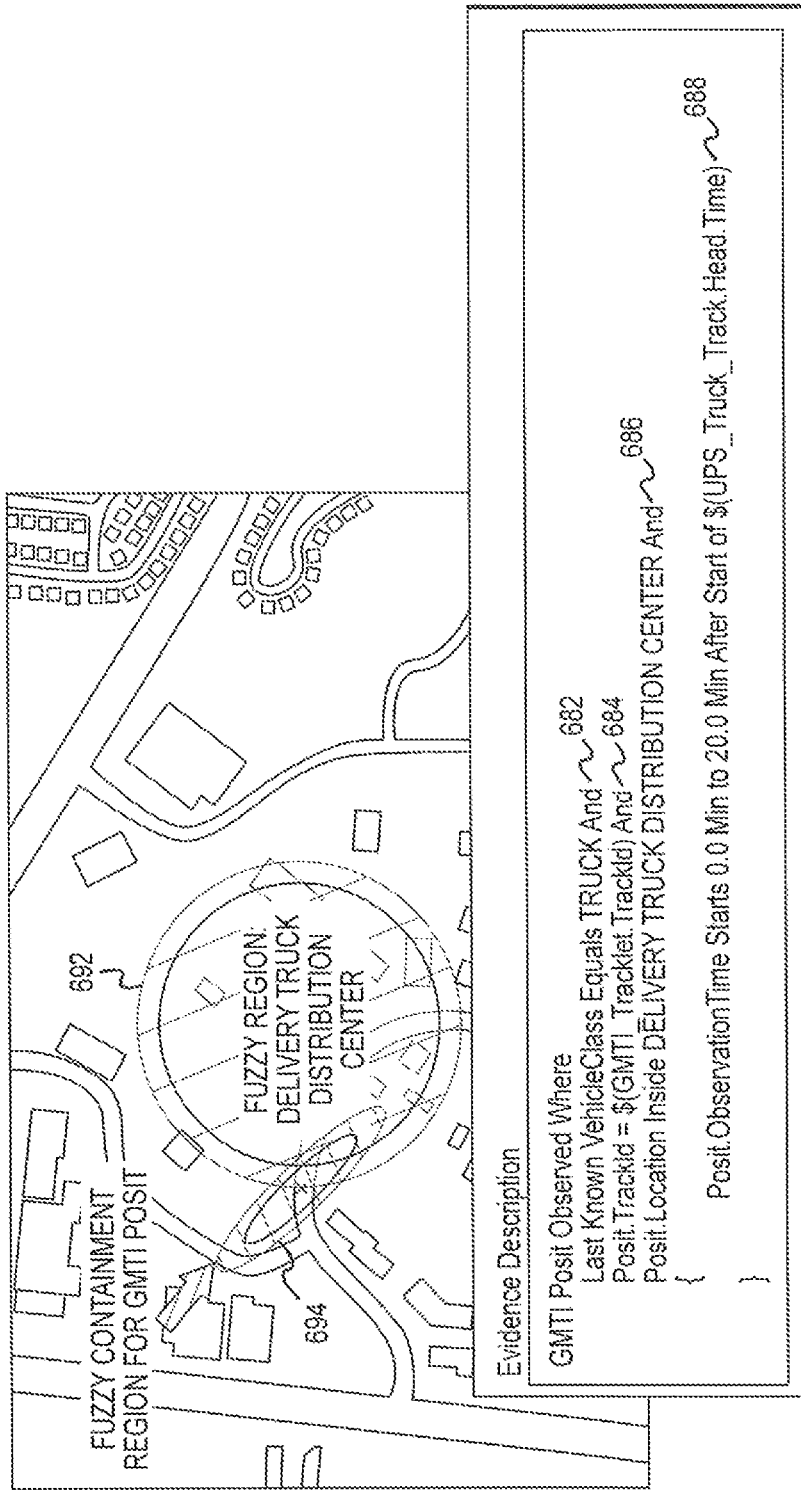

With the exception of latent nodes, each node in a hypothesis model defines a set of evidentiary conditions (a query) that provide support for the inquiry. A sample is shown in FIG. 6C. In this case, the evidentiary conditions apply to a class of observation called "GMTI Posit" and require, 1) the vehicle class is "truck" 682, 2) the GMTI data belongs to the same track that matched the GMTI_Tracklet node 684, 3) The reported location is "inside" a delivery truck Distribution Center 686, and 4) The observation time of the posit was within 20 minutes of the delivery truck's last reported location 688. As observation data is matched against the evidentiary conditions, scoring functions are used to determine the degree to which the observation data matches the evidentiary condition. For example, a scoring function for the temporal condition is shown in FIG. 6C. Although the evidentiary condition defines a temporal window of 0 to 20 minutes, a fuzzy scoring function for this condition on this node can define a wider temporal range of [−5, 30] minutes. While the fuzzy spatial scoring function is not shown, the figure depicts a typical fuzzy exterior boundary 692 for the delivery truck distribution center along with a fuzzy containment region 694 for the reported GMTI position. If a non-fuzzy (i.e., crisp) scoring function were to be used on this condition, the reported GMTI location would be "outside" the delivery truck Distribution Center, and so the score for the third evidentiary condition would be zero. A fuzzy scoring function such as one based on the degree of overlap between the containment ellipse for the reported GMTI location and the fuzzy delivery truck distribution facility region definition would return a non-zero value. (Other potential scoring functions include scoring the "nearness" of the centroid of the ellipse to the inner boundary of the support region for the delivery truck distribution center.)

One skilled in the art should recognize that the present invention could use any number of scoring functions specific to an evidentiary condition, node, and model. In the present invention, scores for each evidentiary condition for a given collection of evidence are combined using Fuzzy Logic. For the given figure, the evidentiary conditions are linked; according the rules of fuzzy logic, the minimum scoring condition defines the score for the node as a whole. As evidence is found and matched against a hypothesis model, that hypothesis is scored using one of several possible scoring methods including confidence increments, Bayesian Reasoning, Dempster-Shafer and the like.

Finally, one or more additional actions can be associated with a hypothesis model. Currently defined using Groovy, actions can be associated at the node or model level and may make use of evidence drawn from a hypothesis associated with that model. Note that Apache Groovy is a powerful, optionally typed and dynamic language, with static-typing and static compilation capabilities, for the Java platform aimed at improving developer productivity thanks to a concise, familiar and easy to learn syntax. In this instance, actions may include data transform (e.g., computing travel distance given a road network, starting location, speed limits, and timeframe; or computing knots from radians per second for ocean going vessels), user alerting and notification, inter-system notification, inter-model notification, data persistence and communication, computation of various values including Value of Information, and issuance of requests for information. For example, the delivery truck model would likely include the following actions.

A data transformation to compute kinematic feasible travel distances for a given truck, road network, and speed limits;

A Value of Information computation for a traffic camera image and given hypothesis. If the VOI threshold is reached for this hypothesis model, this action would also generate a request for information from the network of traffic cameras for an image of the vehicle associated with that hypothesis; and User- and/or system-level notification when a GMTI track is believed to belong to a delivery truck One skilled in the art should recognize that any number of actions can be so defined. It should be noted that actions can be defined to operate at either the hypothesis level (as shown by the preceding example) or at the hypothesis model level. For example, a Value of Information (VOI) calculus could be defined at the model level such that requests for information generated at the hypothesis level are scored at the model level or even at the hypothesis orchestration level (across inquiries). As a simple intra-model example, the two hypotheses sharing the GMTI track in the preceding figure may both potentially be resolved through traffic camera image analysis of the given track. Thus, it may be more effective to image the vehicle associated with that track even though other hypotheses involving other GMTI tracks may individually have higher VOI scores. In this case, the aggregate VOI score for the hypotheses with the shared GMTI track would be higher than any other VOI score associated at the hypothesis level. One skilled in the art should recognize that this approach generalizes to the hypothesis orchestration system. Specifically, because evidentiary conditions may be shared across hypotheses including being shared across hypothesis models and across inquiries, it is possible to identify evidentiary conditions that when satisfied by evidence remove more uncertainty from across the entire hypothesis space than any one information request removes from within a hypothesis space for a given inquiry or hypothesis model. Information requests generated from a VOI analysis at the hypothesis management level make more effective use of limited sensor systems than can be possible using analysis done at the hypothesis, hypothesis model, or inquiry level.

Recall, an inquiry may have one or more hypothesis models, each of which defines the evidence needed to support or refute the question represented in the model. Each hypothesis model has one or more evidence descriptions each consisting of one or more evidentiary conditions (evidence). Each evidentiary condition has an associated scoring function that defines how evidence should be scored for that condition, and each evidence description includes a scoring function defining how scores from the evidentiary conditions should be combined to form a score for the evidence description. Finally, each hypothesis model includes a scoring function that defines how each hypothesis should be scored given the hypothesis model and evidence. Lastly, actions can be associated at the node (evidence description level), hypothesis model, inquiry, and/or hypothesis orchestration levels. Actions, expresses in the current implementation using Groovy, include data transformation, VOI computation, data transfer and recording including inter- and intra-system and inter-model communication, and various system and user notifications. Actions can establish a threshold, meaning the specified action is only carried out if the score referenced in the action exceeds a user-defined threshold value. All evidence at the node, hypothesis model, inquiry, or system level is available to actions defined at the node, hypothesis, inquiry, and hypothesis management levels.

Hypothesis orchestration of the present invention also supports evidence aggregators that can be used to combine the results of two or more evidence queries. An aggregator typically represents a concept in the problem domain that is not directly observable or computed, but whose likelihood is derived based on other evidence. In a large complex hypothesis model, these are also very useful for decomposing the problem and evidence into a set of sub-hypotheses. From a probabilistic reasoning perspective, these aggregators represent latent variables in an underlying Bayesian network.

Another aspect of the present invention is autonomous hypothesis mining. Hypothesis mining occurs when a hypothesis model is formed and an evaluation engine thereafter uses questions defined in the model to continuously search for evidence needed to formulate, score, and resolve hypotheses. The process of searching for evidence to formulate, score and resolve a hypothesis can be initiated with a "single click" that relies on system defaults or can autonomously conduct actions using a "parameterized model", in which the user is prompted to enter information that focuses the analysis on a specific time, space, or collection of entities. This type of targeted analysis limits the set of hypotheses formed while leveraging reusable models.

With Hypothesis mining users have the option to customize actions performed in support of the analysis as well as generating requests for critical evidence alerts when hypotheses are confirmed or rejected. Because the present invention supports forecasting or predictive awareness, evidence requests can also be generated for events that are forecast to occur in the future. This powerful capability facilitates automated sensor tipping and cueing. Other types of evidence requests may trigger human analysis or computationally expensive automated analysis.

As will be appreciated by one of reasonable skill in the relevant art, the present invention involves the analysis of collected data or evidence relative to one or more hypotheses formed in response to an inquiry. Oftentimes it is the case that previously reported observation data may be updated or corrected as new observations are made. In such cases, it may be necessary to re-evaluate hypotheses formed using these data. The present invention includes a truth maintenance capability for handling new, changed, or deleted observation data that has been used as evidence in support of one or more hypotheses. Hypothesis management or orchestration of the present invention addresses two primary use-cases for truth maintenance. The first and more obvious case is to re-evaluate affected hypotheses when new data has been obtained or prior data has changed. The present invention supports this case and includes mechanisms for minimizing the queries and re-evaluation required for each hypothesis. The example above with Mr. Boddy is an example of this type of analysis.

The second truth maintenance use case involves tracking entity state changes over time in environments where entity state is transient in nature. A simple example of this is a data stream that reports the current location of an entity. This typically occurs when a data source only maintains the current state of an entity, which causes previous entity state data to be lost as updates occur. In cases where a hypothesis needs to track evolving entity states using transient state data, the present invention can be configured to recognize and use transient state data rather than using the most recently reported state data. As a simple example, consider a sensor that reports the current revolutions per minute (RPM) of a diesel turbine engine of an ore truck. A hypothesis model designed to forecast potential problems with the vehicle may need to know if the RMP values have ever fallen below a given threshold (indicating engine lugging) or above a given threshold (over revving). In such cases, truth maintenance (updating hypotheses based on changing observation data associated with one or more hypotheses) should not be performed. Because these two different truth maintenance use cases can co-exist within the same hypothesis model, the present invention allows hypothesis modelers to specify truth maintenance requirements at the node level (i.e., truth maintenance can be turned on or off for each individual evidence query.

The present invention also continually monitors observation data for the evidence required to form, support and/or reject hypotheses. These hypotheses are maintained for later analysis as hypotheses may evolve over a period of hours, weeks, or even months as situations unfold and new evidence emerges. In addition, many organizations use these hypotheses to direct mission critical objectives and need to maintain provenance for why decisions were made. There are three categories of data associated with a hypothesis: 1) references to the corresponding hypothesis model; 2) the evidence used to form, confirm and/or reject the hypothesis; and 3) scoring associated with the hypothesis and associated evidence. The truth maintenance issues described above, impact system persistence as the system must save either references or full copies of the evidence depending on which truth maintenance mode each evidence query is operating.

Uncertainty caused by noisy, missing, inaccurate, and contradictory data is a focal point of the present invention. The present invention uses the latest advancements in fuzzy logic to minimize missed detections and false alarms. The invention uses multiple constraint scores associated with a complex Boolean expression combined using basic fuzzy logic to minimize the effect of uncertain data.

In doing so, each node (random variable) in a Bayesian network represents a corresponding evidence query or a sub-hypothesis in the model. Recall that a sub-hypothesis is a node in a hypothesis model that lacks an evidence description. These sub-hypotheses are not directly observable but do help resolve questions associated with the inquiry. The node 'Possible Match' in the Delivery Truck model is an example of this type of node. An inference provides a formal way of combining new evidence with prior belief Through the applications of a technique known as Bayes' rules, Bayesian principles can be applied to various kinds of evidence, whether viewed all at once or over time (i.e., Bayesian updating). The present invention provides an intuitive and simplified semantics by limiting each random variable to outcomes of "Observed" or "Unobserved". These binary random variables are combined based on statistical and causal relationships into a Bayesian belief net that can facilitate powerful predictive analysis. While the simple "Observed" and "Unobserved" semantics significantly reduces network complexity, the present invention leverages Pearl's virtual evidence technique to allow partial evidence matches (i.e., the fuzzy evidence scores described above) to be incorporated into the binary Bayesian network. The user interface of the present invention supports noisy-OR techniques for reducing Bayesian parameter inputs and interactive capabilities for applying Bayesian structural and parameter learning are actively being developed.

Figure 7:
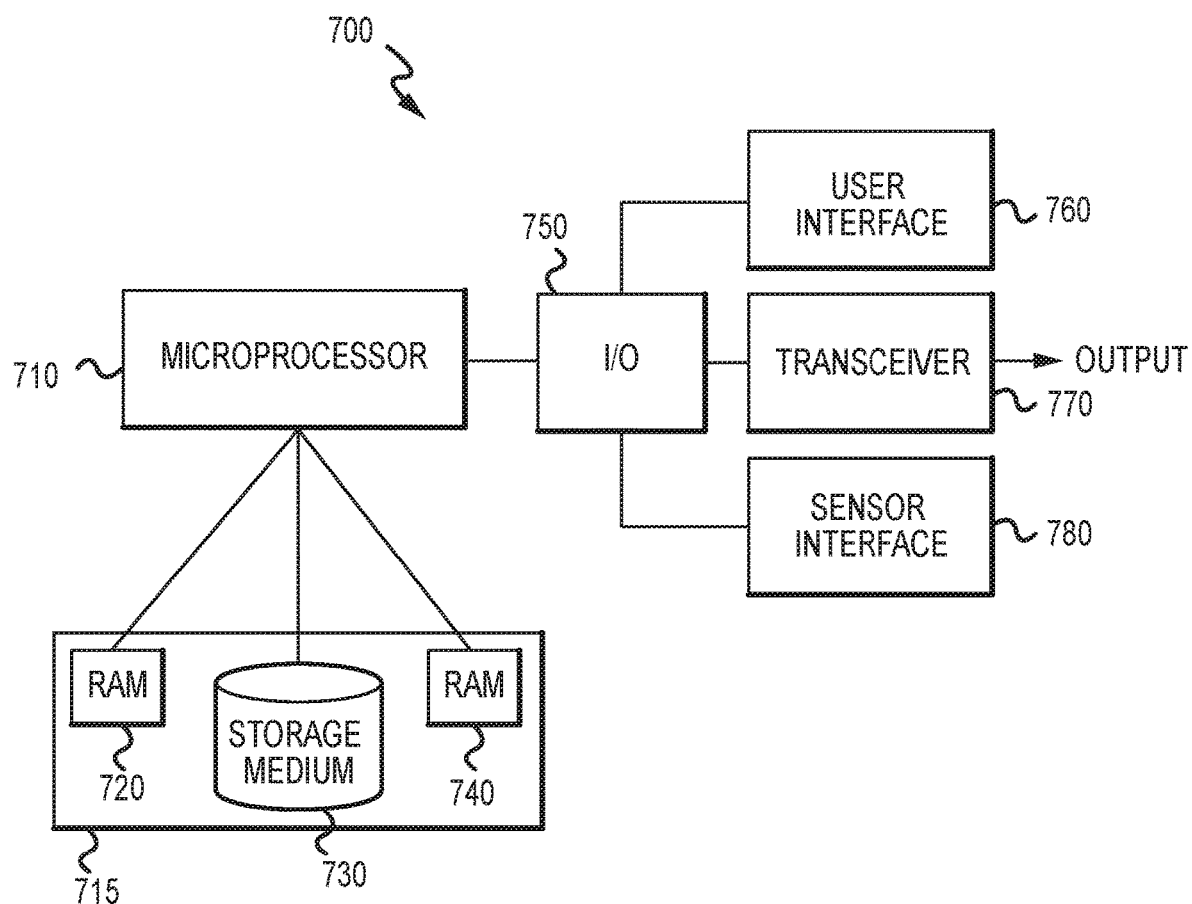
FIG. 7 is a representation of a computing environment suitable for implementation of the hypotheses orchestration system of the present invention.

An exemplary system, shown in FIG. 7, for implementing the invention a general-purpose computing device 700 such as the form of a conventional personal computer, a personal communication device or the like, including a processing unit 710, a system memory 715, and a system bus that communicatively joins various system components, including the system memory 715 to the processing unit. The system bus may be any of several types of bus structures including a memory bus or memory controller, a peripheral bus, and a local bus using any of a variety of bus architectures. The system memory generally includes read-only memory (ROM) 720, random access memory (RAM) 740 and a non-transitory storage medium 730. A basic input/output system (BIOS) 750, containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment. The computing system may further include a user interface 760 to enable users to modify or interact with the system as well as a sensor interface 780 for direct collections of sensor data and a transceiver 770 to output the data as needed.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, the present invention can be implemented in software. Software programming code which embodies the present invention is typically accessed by a microprocessor from long-term, persistent non-transitory storage media of some type, such as a flash drive or hard drive. The software programming code may be embodied on any of a variety of known media for use with a data processing system, such as a diskette, hard drive, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general-purpose computing device such as the form of a conventional personal computer, a server or the like, including a processing unit, a system memory, and a system bus that couple various system components, including the system memory to the processing unit. The system bus may be any of several types of bus structures including a memory bus or memory controller, a peripheral bus, and a local bus using any of a variety of bus architectures. The system memory generally includes read-only memory (ROM) and random-access memory (RAM). A basic input/output system (BIOS), containing the basic routines that help to transfer information between elements within the computer, such as during start-up, is stored in ROM. The computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

An implementation of the present invention may also be executed in a Web environment, where software installation packages are downloaded using a protocol such as the HyperText Transfer Protocol (HTTP) from a Web server to one or more target computers (devices, objects) that are connected through the Internet. Alternatively, an implementation of the present invention may be executing in other non-Web networking environments (using the Internet, a corporate intranet or extranet, or any other network) where software packages are distributed for installation using techniques such as Remote Method Invocation ("RMI") or Common Object Request Broker Architecture ("CORBA"). Configurations for the environment include a client/server network, as well as a multi-tier environment. Furthermore, it may happen that the client and server of a particular installation both reside in the same physical device, in which case a network connection is not required While there have been described above the principles of the present invention in conjunction with a system for hypothesis orchestration, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A computer implemented method for hypothesis orchestration wherein a computer includes one or more processors configured to execute instructions to perform the method and wherein the computer is communicatively coupled to one or more data repositories, the method comprising:
receiving, by the one or more processors via a user interface, a situation characterized by a set of linked inquiries;
searching, by the one or more processors, the one or more data repositories to identify one or more pieces of evidence relevant to the set of linked inquiries, wherein the one or more pieces of evidence are amassed by one or more collection resources and wherein searching includes forming a semantic graph describing the set of linked inquiries for the one or more pieces of evidence;
forming, by the one or more processors, a plurality of hypotheses based on evidence identified as relevant to the set of linked inquiries, wherein each hypothesis is a proposed solution of the situation representing a unique path through the sematic graph of linked pieces of evidence, answering one or more of the set of linked inquiries;
collecting, by the one or more processors, evidence identified as relevant and linked to one or more of the plurality of hypotheses from the one or more data repositories forming, for each hypothesis, a set of collected pieces of evidence;
evaluating, by the one or more processors using fuzzy logic, each of the plurality of hypotheses based on the set of collected pieces of evidence for that hypothesis thereby determining for each hypothesis a confidence value based on a degree on which the set of collected pieces of evidence align with the situation; and
responsive to the confidence value for one or more of the plurality of hypotheses failing to exceed a predefined threshold value,
identifying, by the one or more processors, one or more missing pieces of evidence by comparing the set of collected pieces of evidence with the amassed one or more pieces of evidence relevant to the situation,
isolating, by the one or more processors, one or more common missing pieces of evidence from the one or more missing pieces of evidence that is relevant to two or more of the plurality of hypotheses that failed to exceed the predefined threshold value,
forming, by the one or more processors, a value of information metric of missing information to the situation provided by each common missing piece of evidence,
selecting, by the one or more processors, at least one common missing piece of evidence from the one or more common missing pieces of evidence based on the respective value of information metric of the missing information to address the situation;
initiating, by the one or more processors, an information request to the one or more collection resources directing the one or more collection resources to seek information related to the situation based on the at least one common missing piece of evidence and the value of information metric to reduce uncertainty associated with the plurality of hypotheses;
receiving, by the one or more processors, the information related to the at least one common missing piece of evidence from the one or more collection resources; and
refining, by the one or more processors, the plurality of hypotheses relevant to the situation based on the received information related to the at least one common missing piece of evidence.

2. The method according to claim 1, wherein searching includes defining an evidence inquiry as a branching inquiry or a non-branching inquiry.

3. The method according to claim 2, wherein the branching inquiry automatically generates a new hypothesis for each piece of evidence that satisfies the evidence inquiry.

4. The method according to claim 2, wherein the non-branching inquiry allows a plurality of pieces of evidence satisfying the evidence inquiry to support a single hypothesis.

5. The method according to claim 2, wherein the branching and the non-branching inquiry can be combined.

6. The method according to claim 1, wherein evaluating includes scoring each of the collected pieces of evidence based on fuzzy membership functions.

7. The method according to claim 1, wherein evaluating includes considering a measure of confidence of each of the collected pieces of evidence and a measure of uncertainty of each of the collected pieces of evidence.

8. The method according to claim 1, further comprising, responsive to the confidence value for one or more of the plurality of hypotheses exceeding the predefined threshold value, generating a report identifying the one or more of the plurality of hypotheses for which the confidence value has exceeded the predefined threshold value.

9. A computer implemented system for hypothesis orchestration, comprising:
a user interface;
one or more data repositories;
a processor; and
a non-transitory storage medium housing a plurality of instructions wherein the plurality of instructions when executed by the processor cause
the processor to receive, via the user interface, a situation characterized by a set of linked inquiries,
the processor to form a semantic graph pattern describing the set of linked inquiries for one or more pieces of evidence and thereafter search, using the semantic graph pattern, the one or more data repositories to identify the one or more pieces of evidence relevant to the set of linked inquiries wherein the one or more pieces of evidence are amassed by one or more collection resources,
the processor to form a plurality of hypotheses based on evidence identified as relevant to the set of linked inquiries wherein each hypothesis is a proposed solution of the situation representing a unique path through the sematic graph pattern of linked pieces of evidence answering a subset of the set of linked inquiries,
the processor to collect evidence identified as relevant to one or more of the plurality of hypotheses from the one or more data repositories forming, for each hypothesis, a set of collected pieces of evidence;
the processor to evaluate each of the plurality of hypotheses with fuzzy logic using the set of collected pieces of evidence for that respective hypothesis to determine for each hypothesis a confidence value identifying a degree on which the set of collected pieces of evidence align with the situation, and
responsive to the confidence value for one or more of the plurality of hypotheses failing to exceed a predefined threshold value, the processor to compare the set of collected pieces of evidence with the amassed one or more pieces of evidence relevant to the situation to identify, one or more missing pieces of evidence, the processor to isolate one or more common missing pieces of evidence from the one or more missing pieces of evidence that is relevant to two or more of the plurality of hypotheses that failed to exceed the predefined threshold value, the processor to form a value of information metric of missing information to the situation provided by each common missing piece of evidence, the processor to select at least one common missing piece of evidence from the one or more common missing pieces of evidence based on the respective value of information of the missing information to address the situation;

the processor to initiate an information request to the one or more collection directing resources to seek information related to the situation based on the at least one common missing piece of evidence and on the value of information metric to reduce uncertainty associated with the plurality of hypotheses, the processor to receive the information related to the at least one common missing piece of evidence from the one or more collection resources; and the processor to refine the plurality of hypotheses relevant to the situation based on the received information related to the at least one common missing piece of evidence.

10. The computer implemented system for hypothesis orchestration according to claim 9, wherein evaluating includes considering a measure of confidence of each of the collected pieces of evidence and a measure of uncertainty of each of the collected pieces of evidence.

11. The computer implemented system for hypothesis orchestration according to claim 9, wherein isolating includes scoring each missing piece of evidence with respect to its relevance and correlation to the plurality of hypotheses.

12. The computer implemented system for hypothesis orchestration according to claim 9, wherein the value of information metric is based on collected evidence and a value of collecting missing pieces of evidence.

13. The computer implemented system for hypothesis orchestration according to claim 9, wherein the value of information metric quantifies contribution of a missing piece of evidence to resolve one or more of the plurality of hypotheses.

14. The computer implemented system for hypothesis orchestration according to claim 9, wherein choosing which one of the one or more common missing pieces of evidence to seek is based, in part, on the value of information metric.

15. A non-transitory computer-readable storage medium tangibly embodying a program of instructions executable by a machine for hypothesis orchestration wherein said machine executes said program of instructions to perform operations of hypothesis orchestration, the operations comprising:

receiving, by the machine via a user interface and rendered by the one or more processors, a situation characterized by a set of linked inquiries;

searching, by the machine, one or more data repositories to identify one or more pieces of evidence relevant to the set of linked inquiries, wherein the one or more pieces of evidence are amassed by one or more collection resources and wherein searching includes forming a semantic graph describing the set of linked inquiries for the one or more pieces of evidence;

forming, by the machine, a plurality of hypotheses based on evidence identified as relevant to the set of linked inquiries, wherein each hypothesis is a proposed solution of the situation representing a unique path through the sematic graph of linked pieces of evidence, answering a subset of the set of linked inquiries;

collecting, by the machine, evidence identified as relevant to one or more of the plurality of hypotheses from the one or more data repositories forming, for each hypothesis, a set of collected pieces of evidence;

evaluating, by the machine using fuzzy logic, each of the plurality of hypotheses using the set of collected pieces of evidence for that hypothesis thereby determining for each hypothesis a confidence value identifying a degree on which the set of collected pieces of evidence aligns with the situation; and responsive to the confidence value for one or more of the plurality of hypotheses failing to exceed a predefined threshold value, identifying, by the machine, one or more missing pieces of evidence by comparing the set of collected pieces of evidence with the amassed one or more pieces of evidence relevant to the situation, isolating, by the machine, one or more common missing pieces of evidence from the one or more missing pieces of evidence that is relevant to two or more of the plurality of hypotheses that failed to exceed the predefined threshold value, forming, by the machine, a value of information metric of missing information provided by each common missing piece of evidence to the situation, selecting, by the machine, at least one common missing piece of evidence from the one or more common missing pieces of evidence based on the respective value of information metric of the missing information to address the situation, initiating, by the machine, an information request to the one or more collection resources directing the one or more collection resources to seek information related to the situation based on the at least one common missing piece of evidence based and on the value of information metric to reduce uncertainty associated with one or more of the plurality of hypotheses, receiving, by the machine, the information related to the at least one common missing piece of evidence from the one or more collection resources; and refining, by the machine, the plurality of hypotheses relevant to the situation based on the received information related to the at least one common missing piece of evidence.

16. The non-transitory computer-readable storage medium according to claim 15, wherein the inquiry seeks a predicted outcome based on past events.

17. The non-transitory computer-readable storage medium according to claim 15, wherein the operations further comprising, responsive to the confidence value for one or more of the plurality of hypotheses exceeding the predefined threshold value, program code for generating a report identifying the one or more of the plurality of hypotheses for which the confidence value has exceeded the predefined threshold value.

18. The non-transitory computer-readable storage medium according to claim 15, wherein choosing which one of the one or more common missing pieces of evidence to seek is based, in part, on the value of information metric.

* * * * *